United States Patent
Kasahara

(10) Patent No.: US 7,383,371 B2
(45) Date of Patent: Jun. 3, 2008

(54) PHYSICAL LAYER CIRCUIT, DATA TRANSFER CONTROL DEVICE, AND ELECTRONIC INSTRUMENT

(75) Inventor: Shoichiro Kasahara, Mirowa-machi (JP)

(73) Assignee: Seiko Epson Corporation, Tokyo (JP)

(*) Notice: Subject to any disclaimer, the term of this patent is extended or adjusted under 35 U.S.C. 154(b) by 335 days.

(21) Appl. No.: 11/013,701

(22) Filed: Dec. 17, 2004

(65) Prior Publication Data

US 2005/0138239 A1 Jun. 23, 2005

(30) Foreign Application Priority Data

Dec. 18, 2003 (JP) ............................. 2003-421082

(51) Int. Cl.
*G06F 13/14* (2006.01)
*G06F 13/00* (2006.01)
*G06F 13/20* (2006.01)

(52) U.S. Cl. ........................................ 710/305; 710/300
(58) Field of Classification Search ...................... None
See application file for complete search history.

(56) References Cited

U.S. PATENT DOCUMENTS

| 6,920,569 | B1* | 7/2005 | Wauters et al. | 713/300 |
| 6,963,933 | B2* | 11/2005 | Saito et al. | 710/1 |
| 7,024,504 | B2* | 4/2006 | Saito et al. | 710/110 |
| 7,082,545 | B2* | 7/2006 | Kubo et al. | 713/330 |
| 7,174,408 | B2* | 2/2007 | Ede | 710/306 |
| 7,177,969 | B2* | 2/2007 | Croyle | 710/305 |
| 7,193,442 | B2* | 3/2007 | Zhu | 326/82 |
| 2002/0050936 | A1 | 5/2002 | Kato et al. | |
| 2002/0062457 | A1 | 5/2002 | Kamihara | |
| 2002/0156949 | A1* | 10/2002 | Kubo et al. | 710/72 |
| 2002/0169913 | A1* | 11/2002 | Heizer et al. | 710/302 |
| 2005/0134321 | A1* | 6/2005 | Ede | 327/1 |
| 2005/0158065 | A1* | 7/2005 | Matsuda | 399/66 |
| 2006/0045112 | A1* | 3/2006 | Laiho | 370/419 |
| 2006/0075152 | A1* | 4/2006 | Zhu | 710/15 |

FOREIGN PATENT DOCUMENTS

| JP | A 2001-337752 | 12/2001 |
| JP | A 2002-140136 | 5/2002 |
| JP | A 2002-141911 | 5/2002 |

* cited by examiner

*Primary Examiner*—Paul R. Myers
*Assistant Examiner*—Ryan M Stiglic
(74) *Attorney, Agent, or Firm*—Oliff & Berridge, PLC

(57) ABSTRACT

A physical layer circuit including: a VBUS detection circuit which makes a VBUS detection signal VBDET active when a VBUS voltage has exceeded a predetermined voltage; a receiver circuit which performs reception processing using signals DP and DM; and a reception control circuit which outputs an enable signal to the receiver circuit. When the signal VBDET is inactive, the reception control circuit makes the enable signals COMPENB, SEENB1 and SEENB2 inactive and disables the receiver circuit. When signals FCOMPENB, FSEENB1 and FSEENB2 set by a processing section are active but the signal VBDET is inactive, the reception control circuit makes the signals COMPENB, SEENB1 and SEENB2 inactive.

21 Claims, 12 Drawing Sheets

PHYSICAL LAYER CIRCUIT, DATA TRANSFER CONTROL DEVICE, AND ELECTRONIC INSTRUMENT

Japanese Patent Application No. 2003-421082, filed on Dec. 18, 2003, is hereby incorporated by reference in its entirety.

BACKGROUND OF THE INVENTION

The present invention relates to a physical layer circuit, a data transfer control device, and an electronic instrument.

In recent years, Universal Serial Bus (USB) has attracted attention as an interface standard for connecting electronic instruments. USB is widely used as an interface for connecting a personal computer as a host with a printer or an optical disk drive as a device (peripheral).

In recent years, it has been demanded that a portable telephone or the like be provided with a data transfer control device which implements USB. In the case of incorporating a USB data transfer control device into a portable telephone which operates using a battery, it is preferable to reduce power consumption of the data transfer control device to be incorporated. Various conventional technologies have been proposed as a technology for implementing a reduction of power consumption.

In USB, a data transfer operation is started after a USB cable is connected and the voltage of a VBUS line rises. Therefore, if electric power is consumed by a receiver circuit of the data transfer control device before the USB cable is connected, a problem occurs in which the battery power of the portable telephone is uselessly consumed.

BRIEF SUMMARY OF THE INVENTION

According to a first aspect of the present invention, there is provided a physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;

a receiver circuit which receives first and second signals which are differential signals and performs reception processing using the first and second signals; and a reception control circuit which outputs a first enable signal to the receiver circuit, wherein the reception control circuit makes the first enable signal inactive and disables the receiver circuit when the VBUS detection signal is inactive.

According to a second aspect of the present invention, there is provided a physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage; and a receiver circuit which receives first and second signals which are differential signals and performs reception processing using the first and second signals, wherein the VBUS detection circuit includes a first resistor provided between the VBUS line and a detection node and a second resistor provided between the detection node and a node of a first power supply; and wherein the VBUS detection circuit makes the VBUS detection signal active when a voltage of the detection node has exceeded a predetermined detection voltage.

According to a third aspect of the present invention, there is provided a data transfer control device, comprising:

any of the above-described physical layer circuits; and a transfer controller which controls data transfer using USB.

According to a fourth aspect of the present invention, there is provided an electronic instrument, comprising:

the above-described data transfer control device; and a processing section which controls the data transfer control device.

DETAILED DESCRIPTION OF THE EMBODIMENTS

Figure 1:
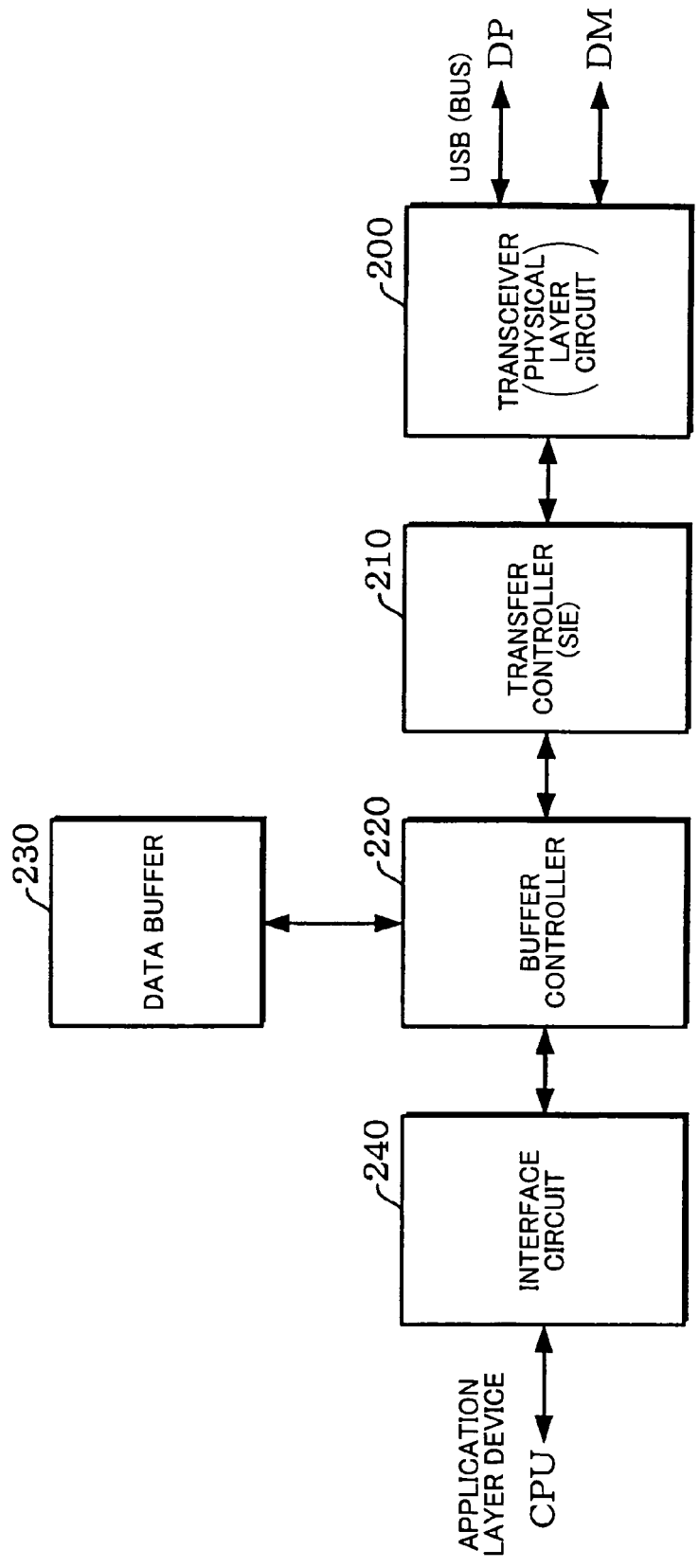
FIG. 1 shows a data transfer control device.

The following embodiments of the present invention may provide a physical layer circuit and a data transfer control device which can reduce electric power uselessly consumed before the USB cable is connected, and an electronic instrument having the data transfer control device.

According to one embodiment of the present invention, there is provided a physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;

a receiver circuit which receives first and second signals which are differential signals and performs reception processing using the first and second signals; and a reception control circuit which outputs a first enable signal to the receiver circuit, wherein the reception control circuit makes the first enable signal inactive and disables the receiver circuit when the VBUS detection signal is inactive.

In this embodiment, the VBUS detection signal becomes active from inactive when the voltage of the VBUS line has exceeded a predetermined voltage, whereby the receiver circuit can be enabled. When the VBUS detection signal is inactive, the first enable signal of the receiver circuit becomes inactive, whereby the receiver circuit is disabled.

This prevents a problem in which electric power is uselessly consumed by the receiver circuit before the connection of the USB cable, for example, whereby power consumption can be reduced.

In this physical layer circuit, the reception control circuit may receive a second enable signal set by a processing section; the reception control circuit may make the first enable signal inactive and disable the receiver circuit when the second enable signal is active but the VBUS detection signal is inactive; and the reception control circuit may make the first enable signal active and enable the receiver circuit when the second enable signal and the VBUS detection signal are active.

This makes it possible to prevent the first enable signal of the receiver circuit from becoming active unless the VBUS detection signal is made active, even if the second enable signal is made active by the processing section. This makes it possible the receiver circuit to be disabled with certainty before the USB cable is connected, independent from the state of the second enable signal.

In this physical layer circuit, the VBUS detection circuit may include a first resistor provided between the VBUS line and a detection node and a second resistor provided between the detection node and a node of a first power supply; and the VBUS detection circuit may make the VBUS detection signal active when a voltage of the detection node has exceeded a predetermined detection voltage.

According to one embodiment of the present invention, there is provided a physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage; and a receiver circuit which receives first and second signals which are differential signals and performs reception processing using the first and second signals, wherein the VBUS detection circuit includes a first resistor provided between the VBUS line and a detection node and a second resistor provided between the detection node and a node of a first power supply; and wherein the VBUS detection circuit makes the VBUS detection signal active when a voltage of the detection node has exceeded a predetermined detection voltage.

By providing the first and second resistors in this manner, the first and second resistors can be used as a voltage division resistor, a current limiting resistor and a pull-down resistor, for example.

In this physical layer circuit, $VB \times RV1/(RV1+RV2) < VR$ may be satisfied, where RV1 and RV2 represent resistances of the first and second resistors, VB represents a voltage supplied to the VBUS line, and VR represents a rated voltage of the VBUS detection circuit.

This enables the rated voltage of the VBUS detection circuit to be maintained, whereby reliability can be improved.

In this physical layer circuit, $RV1+RV2 > VB/IS$ may be satisfied, where RV1 and RV2 represent resistances of the first and second resistors, VB represents a voltage supplied to the VBUS line, and IS represents an allowable value of current flowing from the VBUS line to the physical layer circuit in suspend mode.

This makes it possible to deal with a demand relating to the standard for the allowable value of the current which flowing from the VBUS line to the physical layer circuit.

In this physical layer circuit, the receiver circuit may include a differential receiver having first and second differential inputs to which the first and second signals are respectively input; and a current source transistor of an operational amplifier circuit in the differential receiver may be turned OFF when the first enable signal is inactive.

This prevents an unnecessary current from flowing through the differential receiver before the USB cable is connected.

The physical layer circuit may further comprise a reference voltage generation circuit which outputs a reference voltage to the current source transistor, wherein an output node of the reference voltage generation circuit may be set to a power supply voltage and a current flowing through the reference voltage generation circuit may be terminated, when the first enable signal is inactive.

This prevents an unnecessary current from flowing through the differential receiver and the reference voltage generation circuit before the USB cable is connected.

In this physical layer circuit, the reference voltage generation circuit may include:

first and second transistors which are of a first conductivity type and form a current mirror circuit;

third transistor which is of a second conductivity type, connected in series with the first transistor, and turned ON when the first enable signal is active;

fourth transistor which is of the second conductivity type, connected in series with the second transistor, and has a gate and a drain connected to the output node of the reference voltage generation circuit; and fifth transistor which is of the second conductivity type and provided between the output node and a node of a first power supply; and wherein the third transistor may be turned OFF and the fifth transistor may be turned ON when the first enable signal is inactive.

This enables the output node of the reference voltage generation circuit to be set to the power supply voltage (or a voltage of the first or second power supply) and enables to terminate current flowing through the reference voltage generation circuit, with a simple configuration.

In this physical layer circuit, the receiver circuit may include a first single end receiver having an input to which the first signal is input, and a second single end receiver having an input to which the second signal is input;

each of the first and second single end receivers may include a first inverter circuit to which the first or second signal is input, and a second inverter circuit having an input to which an output node of the first inverter circuit is connected; and the output node of the first inverter circuit and an output node of the second inverter circuit may be set to a power supply voltage when the first enable signal is inactive.

This prevents a shoot-through current from occurring in the first and second inverter circuits and the like.

In this physical layer circuit, the first inverter circuit may include:

a first transistor which is of a first conductivity type, provided between a node of a second power supply and a first intermediate node, and set to an ON state;

a second transistor which is of the first conductivity type, provided between the first intermediate node and the output node of the first inverter circuit, and has a gate to which the first or second signal is input;

a third transistor which is of a second conductivity type, provided between the output node and a second intermediate node, and has a gate to which the first or second signal is input;

a fourth transistor which is of the second conductivity type, provided between the second intermediate node and a node of a first power supply, and set to an ON state;

a fifth transistor which is of the first conductivity type, provided between the node of the second power supply and the first intermediate node, and has a gate to which a feedback signal from the second inverter circuit is input;

a sixth transistor which is of the first conductivity type and provided between the first intermediate node and the output node; and a seventh transistor which is of the second conductivity type, provided between the second intermediate node and the node of the first power supply, and has a gate to which the feedback signal is input; and the sixth transistor may be turned ON when the first enable signal is inactive.

This enables the output node of the first inverter circuit to be set to the power supply voltage by effectively utilizing the first transistor set to the ON state and the sixth transistor which is turned ON when the enable signal is inactive.

In this physical layer circuit, the receiver circuit may be a USB full speed receiver circuit.

According to one embodiment of the present invention, there is provided a data transfer control device, comprising: any of the above-described physical layer circuits; and a transfer controller which controls data transfer using USB.

According to one embodiment of the present invention, there is provided an electronic instrument, comprising: the above-described data transfer control device; and a processing section which controls the data transfer control device.

These embodiments will be described in detail below. Note that the embodiments described below do not in any way limit the scope of the invention laid out in the claims herein. In addition, not all of the elements of the embodiments described below should be taken as essential requirements of the present invention.

1. Data Transfer Control Device

FIG. 1 shows a data transfer control device according to one embodiment of the present invention. The data transfer control device shown in FIG. 1 includes a transceiver 200, a transfer controller 210, a buffer controller 220, a data buffer 230, and an interface circuit 240. Some of these circuit blocks may be omitted, or the connection configuration of the circuit blocks may be changed, or another circuit block may be added. For example, the data transfer control device may have a configuration in which the buffer controller 22, the data buffer 230, and the interface circuit 240 are omitted.

The transceiver 200 is a circuit for transmitting and receiving data using differential signals DP and DM (differential data signals). The transceiver 200 includes a USB (given interface standard in a broad sense) physical layer circuit (analog front-end circuit), for example. A circuit in a layer other than the physical layer may be included in the transceiver 200.

The transfer controller 210 is a controller for controlling data transfer through the USB, and implements a function of a serial interface engine (SIE) or the like. The transfer controller 210 performs packet handling processing, suspend & resume control, or transaction management, for example.

The buffer controller 220 allocates a storage region (endpoint region or the like) in a data buffer 230, and controls access to the storage region of the data buffer 230. In more detail, the buffer controller 220 controls access from the application layer device through the interface circuit 240, access from the CPU through the interface circuit 240, or access from the USB (transfer controller 210), arbitrates these accesses, or generates and manages access addresses.

The data buffer 230 (packet buffer) is a buffer (FIFO) for temporarily storing (buffering) data (transmission data or reception data) transferred through the USB. The data buffer 230 may be formed by a memory such as a RAM.

The interface circuit 240 is a circuit for implementing an interface through a direct memory access (DMA) bus to which the application layer device is connected and a CPU bus to which the CPU is connected. The interface circuit 240 may include a DMA handler circuit for DMA transfer, for example.

2. Transceiver

Figure 2:
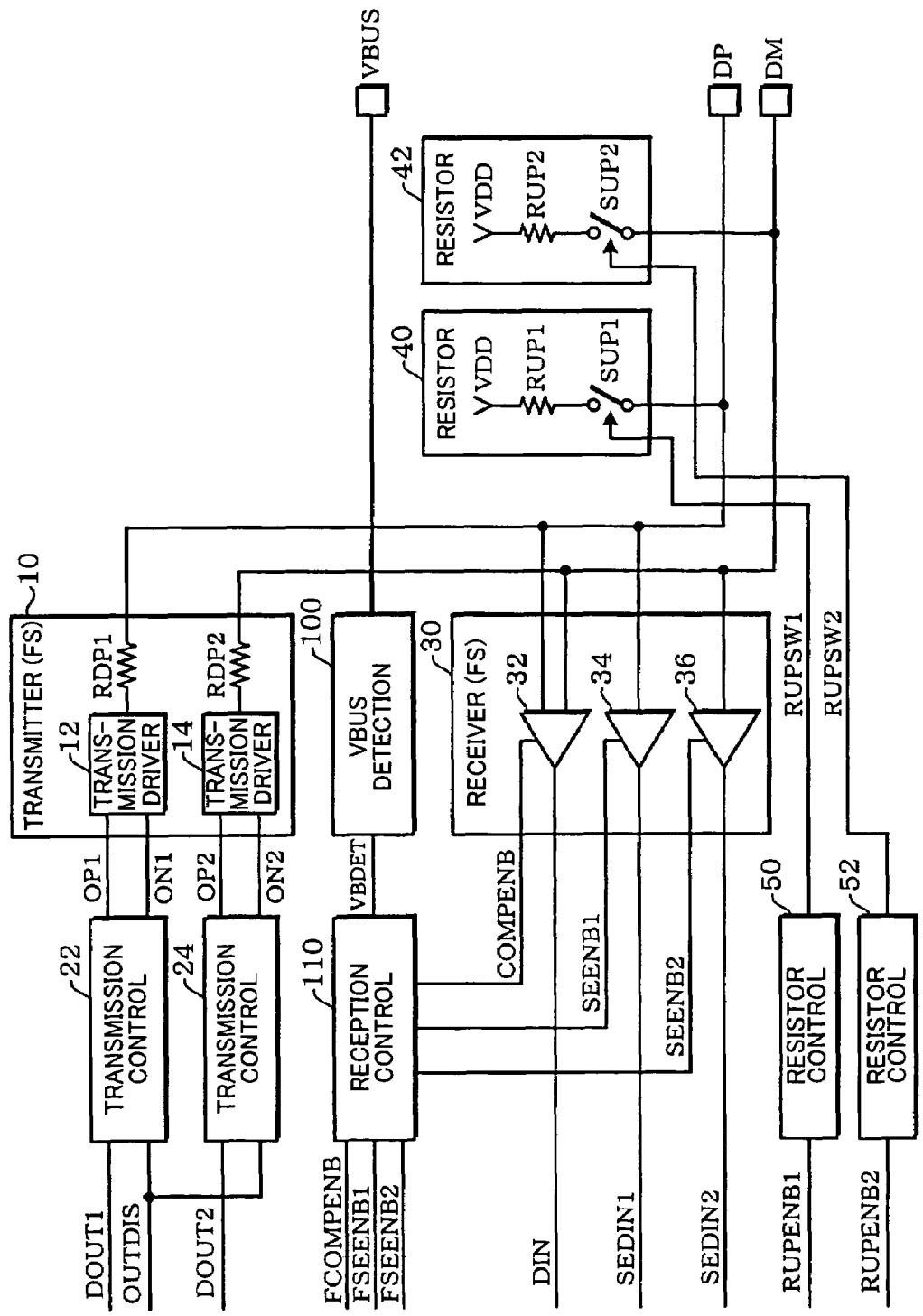
FIG. 2 shows a physical layer circuit.

FIG. 2 shows a physical layer circuit included in the transceiver 200.

In FIG. 2, the transmitter circuit 10 is a circuit for performing data transmission processing using the differential signals DP and DM in the USB FS mode, for example. The transmitter circuit 10 includes a first transmission driver 12 which drives a signal line for the signal DP (first signal in a broad sense) which makes up the differential signals, and a second transmission driver 14 which drives a signal line for the signal DM (second signal in a broad sense) which makes up the differential signals. The differential signals can be transferred by driving the signal lines for the signals DP and DM by the transmission drivers 12 and 14.

The transmitter circuit 10 includes a first damping resistor RDP1 and a second damping resistor RDP2 respectively connected with the signal lines (pads) for the signals DP and DM. One end of the damping resistors RDP1 and RDP2 is respectively connected with the outputs of the transmission drivers 12 and 14. and the other end is respectively connected with the signal lines for the signals DP and DM. The transmitter circuit 10 (integrated circuit device) may have a configuration in which the damping resistors RDP1 and RDP2 are omitted. In this case, the damping resistors RDP1 and RDP2 may be implemented by external parts.

First and second transmission control circuits 22 and 24 are circuits for controlling the first and second transmission drivers 12 and 14. In more detail, the transmission control circuit 22 receives a transmission data signal DOUT1 and an output disable signal OUTDIS from the circuit in the previous stage (circuit in the macrocell MC2, for example), and outputs control signals OP1 and ON1 to the transmission driver 12. The transmission control circuit 24 receives signals DOUT2 and OUTDIS from the circuit in the previous stage, and outputs control signals OP2 and ON2 to the transmission driver 14.

A receiver circuit 30 is a circuit to which the signals DP and DM (first and second signals) forming the differential signals are input and which performs reception processing using the signals DP and DM in the USB FS mode, for example. The receiver circuit 30 includes a differential receiver 32, and first and second single end receivers 34 and 36.

The differential receiver 32 (differential comparator) differentially amplifies the differential signals input through the signal lines for the signals DP and DM, and outputs the amplified signal to the circuit in the next stage (circuit in the macrocell MC2, for example) as a data signal DIN. The differential receiver 32 may be implemented by an operational amplifier circuit having first and second differential inputs to which the signals DP and DM are input. The operation of the differential receiver 32 is enabled or disabled by an enable signal COMPENB.

The single end receiver 34 amplifies the single end signal input through the signal line for the signal DP, and outputs the amplified signal to the circuit in the next stage (circuit in the macrocell MC2, for example) as a data signal SEDIN1. The single end receiver 36 amplifies the single end signal input through the signal line for the signal DM, and outputs the amplified signal to the circuit in the next stage as a data signal SEDIN2. The single end receivers 34 and 36 may be implemented by buffer circuits having hysteresis characteristics in which the threshold voltage differs between the rising time and the falling time of the input voltage, for example. The operations of the single end receivers 34 and 36 are enabled or disabled by enable signals SEENB1 and SEENB2.

A pull-up resistor circuit 40 is a circuit for pulling up the signal line for the signal DP. The resistor circuit 40 includes a switch element SUP1 implemented by a transistor or the like, and a 1.5 Kohm pull-up resistor RUP1, for example. In more detail, one end of the switch element SUP1 is connected with the signal line for the signal DP, and the other end is connected with one end of a resistor RUP1. The other end of the resistor RUP1 is connected with a power supply VDD.

A resistor circuit 42 is a dummy resistor circuit for forming, on the signal line for the signal DM, a parasitic capacitance equivalent to a parasitic capacitance formed by connecting the resistor circuit 40 with the signal line for the signal DP or the like. The resistor circuit 42 includes a switch element SUP2 and a resistor RUP2 respectively having the same configuration as the switch element SUP1 and the resistor RUP1 of the resistor circuit 40 (same gate length and gate width, and same resistance). In more detail, one end of the switch element SUP2 is connected with the signal line for the signal DM, and the other end is connected with one end of a resistor RUP2.

Figure 3:
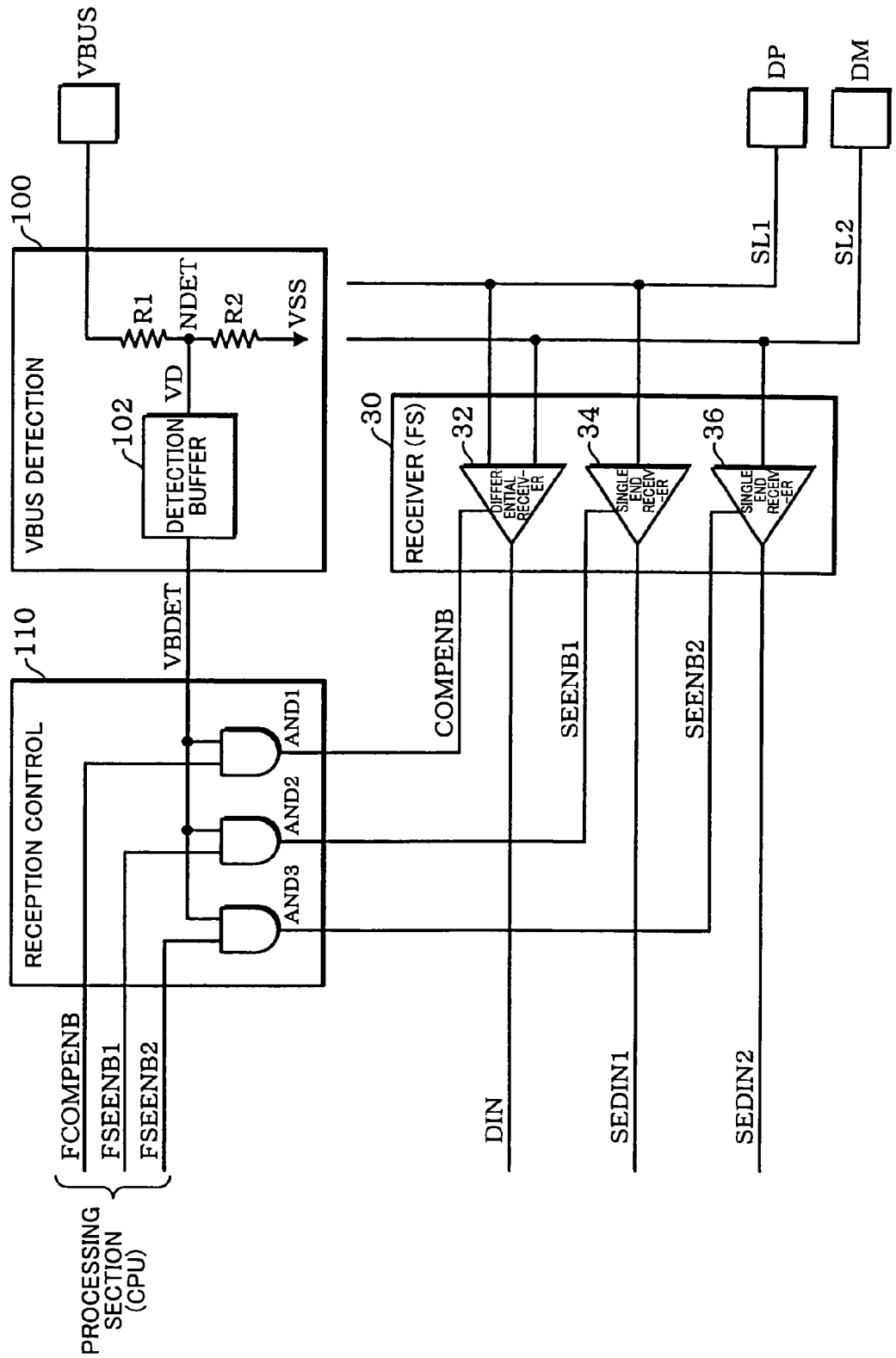
FIG. 3 shows a VBUS detection circuit and a reception control circuit.

In FIG. 3, the resistors RUP1 and RUP2 are provided on the side of the power supply VDD. However, the switch elements SUP1 and SUP2 may be provided on the side of the power supply VDD.

Resistor control circuits 50 and 52 are circuits for respectively controlling the resistor circuits 40 and 42. In more detail, the resistor control circuits 50 and 52 generate signals RUPSW1 and RUPSW2 which control ON/OFF of the switch elements SUP1 and SUP2, and output the signals RUPSW1 and RUPSW2 to the resistor circuits 40 and 42, respectively.

The resistor control circuit 50 outputs the signal RUPSW1 based on a pull-up enable signal RUPENB from the circuit in the previous stage (circuit in the macrocell MC2, for example) to ON/OFF control the switch element SUP1. The resistor control circuit 52 outputs the signal RUPSW2 based on a pull-up enable signal RUPENB2 from the circuit in the previous stage to ON/OFF control the switch element SUP2.

A VBUS detection circuit 100 monitors the voltage of the USB VBUS line (power supply line in a broad sense), and makes a VBUS detection signal VBDET active (high level, for example) when the voltage of the VBUS line has exceeded a predetermined voltage (operation effective voltages such as 4.4 V or 4.65 V, for example).

A reception control circuit 110 is a circuit which controls enabling and disabling of the receiver circuit 30. In more detail, the reception control circuit 110 receives the VBUS detection signal VBDET from the VBUS detection circuit 100. When the VBUS detection signal VBDET is inactive (low level, for example), the reception control circuit 110 makes the enable signals COMPENB, SEENB1 and SEENB2 output to the receiver circuit 30 inactive to disable the receiver circuit 30. Specifically, the reception control circuit 110 disables the differential receiver 32, the first single end receiver 34, and the second single end receiver 36 by the signals COMPENB, SEENB1, and SEENB2, respectively. When the VBUS detection signal VBDET is inactive, the receiver circuit 30 may be disabled by a signal set by a processing section (firmware).

3. VBUS detection circuit and Reception Control Circuit

FIG. 3 shows the VBUS detection circuit 100 and the reception control circuit 110. The VBUS detection circuit 100 and the reception control circuit 110 in this embodiment are not limited to the configuration shown in FIG. 3. Some of the circuit elements shown in FIG. 3 may be omitted, or the connection configuration of the circuit elements may be changed, or a circuit element differing from the elements shown in FIG. 3 may be added.

The VBUS detection circuit 100 includes first and second resistors R1 and R2 connected in series, and a detection buffer 102. In more detail, the resistor R1 is provided between the VBUS line (VBUS pad) and a detection node NDET. The resistor R2 is provided between the detection node NDET and a node of a power supply VSS (first power supply in a broad sense). This causes a voltage VD obtained by dividing the VBUS voltage by the resistors R1 and R2 to be generated at the detection node NDET.

When the voltage VD of the detection node NDET has exceeded a predetermined detection voltage, the detection buffer 102 makes the VBUS detection signal VBDET active (high level). The detection buffer 102 is a buffer which changes the voltage level of the VBUS detection signal VBDET when the voltage VD of the detection node NDET has exceeded a threshold voltage of the detection buffer 102, and may be implemented by a buffer having hysteresis characteristics relating to the threshold voltage, for example.

The reception control circuit 110 receives the VBUS detection signal VBDET from the VBUS detection circuit 100 and second enable signals FCOMPENB, FSEENB1, and FSEENB2. The reception control circuit 110 outputs the enable signals COMPENB, SEENB1, and SEENB2 to the differential receiver 32 and the single end receivers 34 and 36 of the receiver circuit 30.

The second enable signals FCOMPENB, FSEENB1, and FSEENB2 are signals set by the processing section (CPU and firmware) which controls the data transfer control device. In more detail, the signals FCOMPENB, FSEENB1, and FSEENB2 are output from a control register included in the data transfer control device. The processing section writes information for enabling or disabling the differential receiver 32 and the single end receivers 34 and 36 into the control register. For example, when information for enabling the differential receiver 32 and the single end receivers 34 and 36 is written into the control register by the processing section, the signals FCOMPENB, FSEENB1, and FSEENB2 become active (high level). When information for disabling the differential receiver 32 and the single end receivers 34 and 36 is written into the control register by the processing section, the signals FCOMPENB, FSEENB1, and FSEENB2 become inactive (low level).

The reception control circuit 110 calculates the logical AND of the VBUS detection signal VBDET and the second enable signals FCOMPENB, FSEENB1, and FSEENB2, for example, and outputs the resulting enable signals COMPENB, SEENB1, and SEENB2. The logical AND calculation is implemented by an AND1 circuit, an AND2 circuit, and an AND3 circuit (logic circuits or logical AND logic circuits in a broad sense) having first inputs to which the VBUS detection signal VBDET is input and also having second inputs to which the signals FCOMPENB, FSEENB1, and FSEENB2 are input.

This makes the enable signals COMPENB, SEENB1 and SEENB2 output to the receiver circuit 30 inactive (low level) when the VBUS detection signal VBDET is inactive (low level), even if the second enable signals FCOMPENB, FSEENB1, and FSEENB2 are active (high level). The differential receiver 32 and the single end receivers 34 and 36 of the receiver circuit 30 are disabled.

When the second enable signals FCOMPENB, FSEENB1, and FSEENB2 and the VBUS detection signal VBDET are active (high level), the enable signals COMPENB, SEENB1, and SEENB2 become active (high level). This enables the differential receiver 32 and the single end receivers 34 and 36 of the receiver circuit 30.

In FIG. 3, the signals SEENB1 and SEENB2 for the single end receivers 34 and 36 may be one common signal, and the signals FSEENB1 and FSEENB2 may be one common signal. Specifically, the reception control circuit 110 may control enabling and disabling of the single end receivers 34 and 36 by receiving one signal FSEENB and outputting one signal SEENB to the single end receivers 34 and 36. In this case, only two AND circuits may be provided in the reception control circuit 110. The signals COMPENB, SEENB1, and SEENB2 may be one common signal, and the signals FCOMPENB, FSEENB1, and FSEENB2 may be one common signal. For example, the reception control circuit 110 may control enabling and disabling of the differential receiver 32 and the single end receivers 34 and 36 by receiving one signal FRENB and outputting one signal RENB to the differential receiver 32 and the single end receivers 34 and 36. In this case, only one AND circuit may be provided in the reception control circuit 110.

4. Disabling of Receiver Circuit

A sequence from a suspend state until FS data transfer is started in USB is described below with reference to FIGS. 4A and 4B.

When the data transfer control device (electronic instrument) stands ready in the suspend state (step S1), the power supply is started to VBUS when the USB cable is connected, whereby the suspend state is canceled (step S2). As shown in FIG. 4B, the host side pulls down the signal line for the signals DP and DM and the device side pulls up the signal line for the signal DP (step S3). For example, in FIG. 2, the data transfer control device on the device side turns ON the switch SUP1 to pull up the signal line for the signal DP.

The single end receiver detects the FS J state (step S4). Specifically, the single end receiver 34 shown in FIG. 2 detects whether or not the signal line for the signal DP is at an appropriate pull-up voltage. The single end receiver 36 detects whether or not the signal line for the signal DM is at an appropriate pull-down voltage. When the FS J state (pull-up of DP and pull-down of DM) has been detected, an FS data transfer using the differential receiver 32 starts (step S5).

Figure 4A:
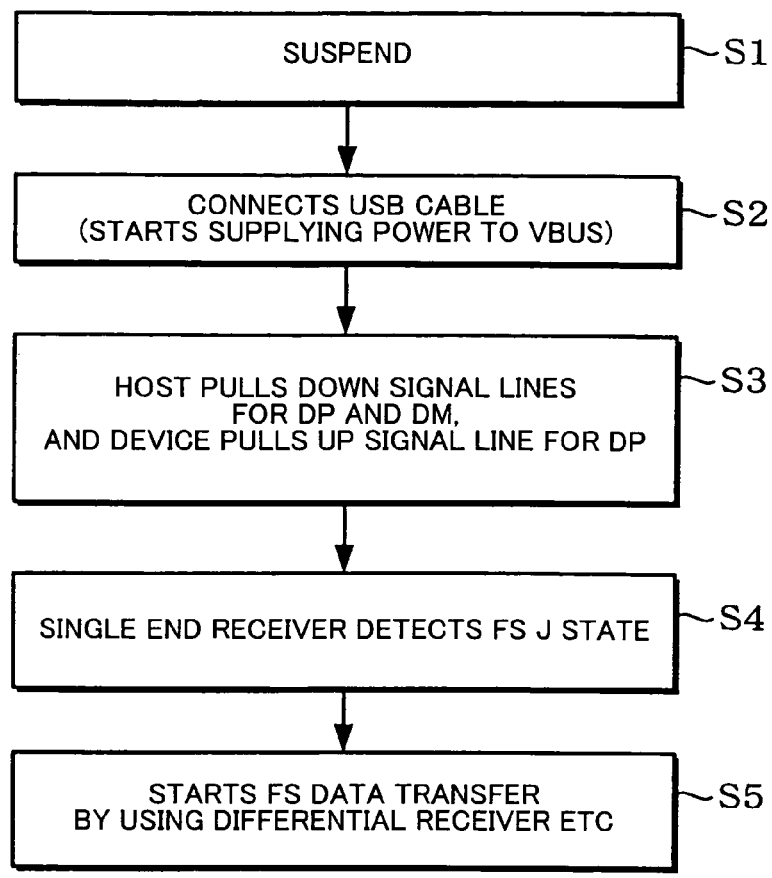
FIGS. 4A and 4B are illustrative of a sequence until USB data transfer starts.
Figure 4B:
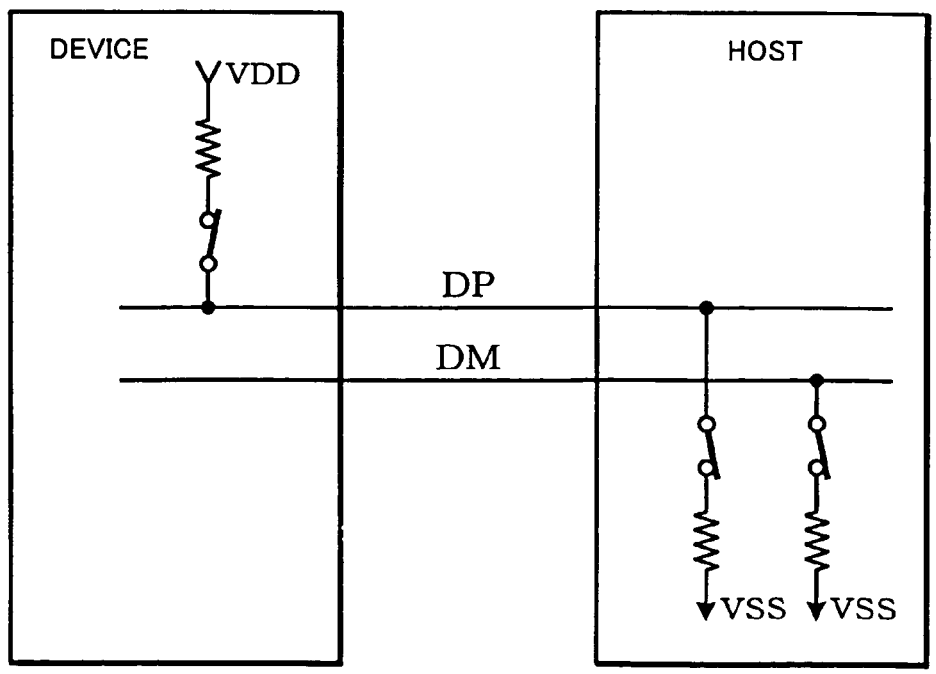

As shown in FIG. 4A, the USB data transfer control device starts the data transfer operation (detection of FS J state and FS data transfer) after the USB cable has been connected and the power supply is started to VBUS (after the VBUS voltage has risen). Therefore, unnecessary electric power is consumed if electric power is consumed by the receiver circuit 30 before the USB cable is connected.

However, in a conventional data transfer control device, the receiver circuit 30 is also enabled before the USB cable is connected. Therefore, an unnecessary current flows through the receiver circuit 30 before the USB cable is connected, whereby a reduction of power consumption is hindered.

Before the USB cable is connected, the signal lines for the signals DP and DM are in a floating state in which no signal is supplied. Since the signal lines for the signals DP and DP in the floating state are connected to gates of transistors forming circuits disposed in the first stage of the single end receivers 34 and 36, a problem occurs in which a shoot-through current flows through the circuits in the first stage.

In this embodiment, the VBUS detection circuit 100 and the reception control circuit 110, which are not provided in a conventional data transfer control device, are additionally provided. The VBUS detection circuit 100 detects whether or not the voltage of the VBUS line has exceeded a predetermined voltage, and outputs the VBUS detection signal. When the VBUS detection signal is inactive, the reception control circuit 110 makes the enable signals COMPENB, SEENB1 and SEENB2 inactive to disable the receiver circuit 30.

This enables the receiver circuit to be disabled with certainty by the hardware circuit (VBUS detection circuit 100 and reception control circuit 110) before the USB cable is connected. Therefore, a problem in which an unnecessary current flows through the receiver circuit 30 before the USB cable is connected can be prevented. Moreover, since the single end receivers 34 and 36 are disabled even if the signal lines for the signals DP and DM are in the floating state before the USB cable is connected, a problem in which a shoot-through current flows through the circuits in the first stage can be prevented, whereby power consumption can be reduced. For example, when the data transfer control device in this embodiment (physical layer circuit) is incorporated into a portable telephone having a USB interface, a problem in which the battery of the portable telephone is unnecessarily consumed when the USB cable is not connected can be prevented.

According to this embodiment, as shown in FIG. 3, even if the second enable signals FCOMPENB, FSEENB1 and FSEENB2 are made active by the processing section, when the VBUS detection signal VBDET is inactive, the enable signals COMPENB, SEENB1, and SEENB2 become inactive, whereby the receiver circuit 30 is disabled. This enables the receiver circuit 30 to be disabled by the hardware circuit before the USB cable is connected independent from the setting by the processing section.

As is clear from the USB sequence shown in FIG. 4A, after the USB cable has been connected, the single end receivers 34 and 36 detect the FS J state before the data transfer starts. Therefore, the firmware of the processing section enables the single end receivers 34 and 36 before the USB cable is connected and allows the single end receivers 34 and 36 to be in the standby state. In particular, a self-powered data transfer control device operation can operate by its own power supply even if electric power is not supplied to VBUS. Therefore, the firmware may likely make the signals FCOMPENB, FSEENB1 and FSEENB2 active before the USB cable is connected.

According to this embodiment, even if the signals FCOMPENB, FSEENB1 and FSEENB2 are made active by the firmware, the signals COMPENB, SEENB1, and SEENB2 do not become active as long as the signal VBDET does not become active. Therefore, the receiver circuit 30 can be disabled by the hardware circuit with certainty before the USB cable is connected, whereby a highly reliable power management can be implemented.

It suffices that the single end receivers 34 and 36 be enabled at least before the step S4 in FIG. 4A, and that the differential receiver 32 be enabled at least before the step S5. Therefore, it suffices that the firmware of the processing section enable the single end receivers 34 and 36 by causing the signals FSEENB1 and FSEENB2 to become active before the step S4. It suffices that the firmware enables the differential receiver 32 by causing the signal FSCOMPENB to become active. This further reduces power consumption.

5. Resistor of VBUS detection circuit

Figure 5:
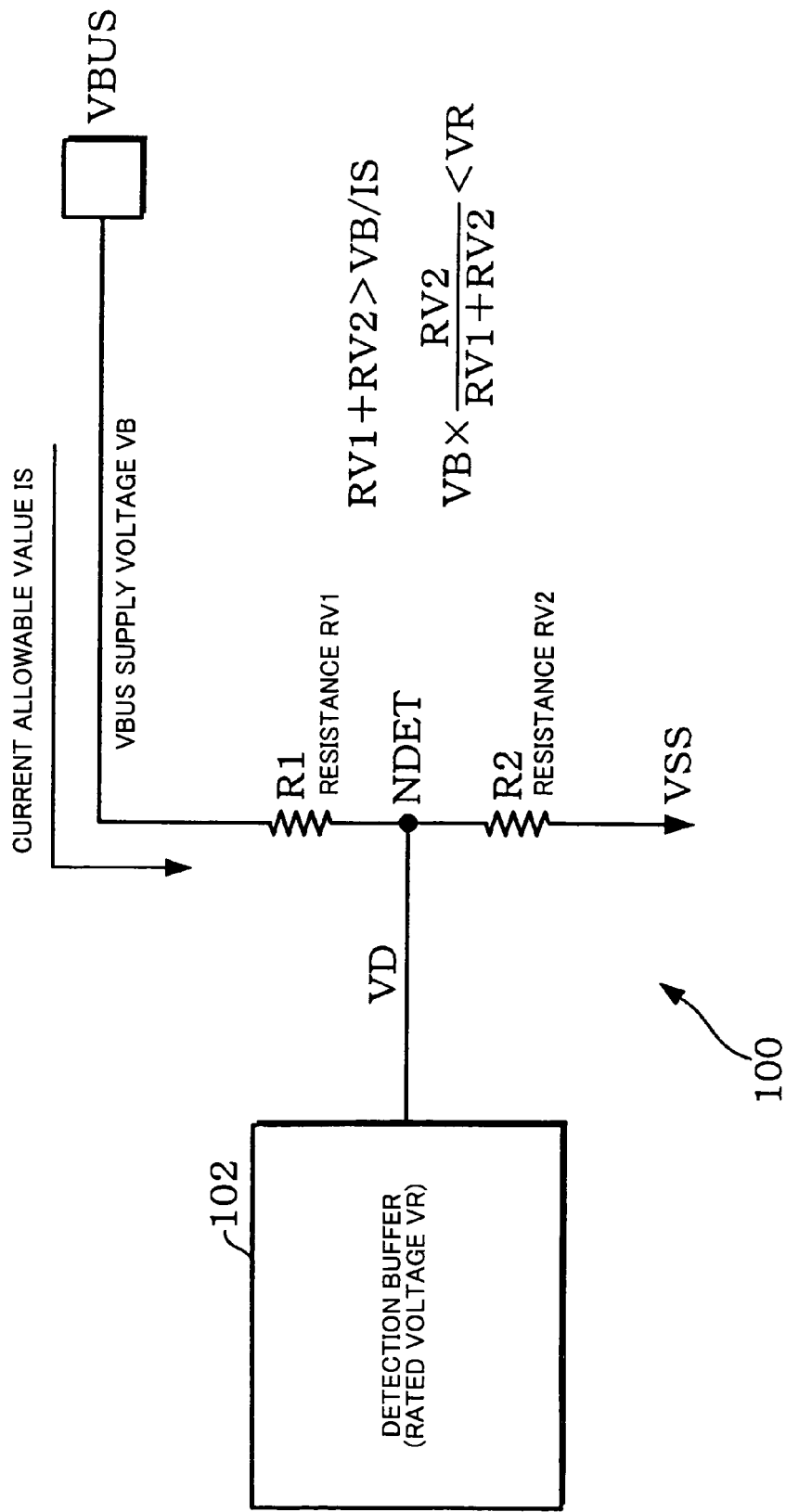
FIG. 5 is illustrative of a resistor of a VBUS detection circuit.

As shown in FIG. 5, the VBUS detection circuit 100 in this embodiment divides the VBUS supply voltage VB by the resistors R1 and R2. The resulting divided voltage VD is input to the detection buffer 102. This leads to the following advantages.

Since the integrated circuit device which implements the data transfer control device (physical layer circuit) has been reduced in size, the power supply voltage is as low as 3.3 V or 1.8 V, whereby the rated voltage VR (maximum rated voltage) of the detection buffer 102 shown in FIG. 5 is decreased. On the other hand, since the VBUS supply voltage VB is 5 V at a typical value, if the supply voltage VB of 5 V is directly input to the detection buffer 102, the rated voltage VR of the detection buffer 102 cannot be maintained.

In FIG. 5, the voltage VD obtained by dividing the VBUS supply voltage VB by the resistors R1 and R2 is input to the detection buffer 102. Therefore, if the resistors R1 and R2 are set so that the divided voltage VD is lower than the rated voltage of the detection buffer 102, the rated voltage VR of the detection buffer 102 can be kept. In this case, when the resistances of the resistors R1 and R2 are denoted by RV1 and RV2, the voltage supplied to the VBUS line is denoted by VB, and the rated voltage of the detection buffer 102 (VBUS detection circuit) is denoted by VR, it is preferable that the following relational formula be satisfied.

$$VD=VB \times RV1/(RV1+RV2)<VR \tag{1}$$

In USB, an allowable value (maximum value) IS of current which flows toward the physical layer circuit (data transfer control device) through the VBUS line in the suspend state is standardized such as IS=500 µA. This reduces an unnecessary current which flows through the VBUS line in the suspend state as much as possible in a self-powered data transfer control device which does not require a power supply to VBUS, whereby power consumption of the entire system can be reduced.

Therefore, in FIG. 5, the resistors R1 and R2 are provided between the VBUS line and the power supply VSS. A current which flows toward the power supply VSS through the VBUS line can be limited by providing the resistors R1 and R2. This makes it possible to satisfy a requirement in the USB standard relating to the current allowable value IS in the suspend state (IS=500 µA). In this case, when the resistances of the resistors R1 and R2 are denoted by RV1 and RV2, the voltage supplied to the VBUS line is denoted by VB, and the allowable value of current which flows toward the physical layer circuit (data transfer control device ) through the VBUS line is denoted by IS, it is preferable that the following relational formula be satisfied.

$$RV1+RV2>VB/IS \tag{2}$$

The VBUS line is in a floating state in which no signal is supplied before the USB cable is connected. Therefore, if a configuration in which the VBUS line is directly connected with the detection buffer 102 is employed, the VBUS line in the floating state is connected with the gate of the transistor which makes up the circuit in the first stage of the detection buffer 102, whereby a shoot-through current occurs in the circuit in the first stage.

In FIG. 5, since electric power is not supplied to VBUS before the USB cable is connected, the resistor R2 functions as a pull-down resistor. Therefore, the voltage of the detection node NDET is set to the voltage of the power supply VSS (0 V) by pulling down before the USB cable is connected. As a result, the voltage VSS is input to the gate of the transistor which makes up the circuit in the first stage of the detection buffer 102, whereby a problem in which a shoot-through current occurs in the circuit in the first stage can be prevented.

As described above, according to the configuration shown in FIG. 5, the resistors R1 and R2 can have the role as the voltage division resistors for maintaining the rated voltage of the detection buffer 102, the role as the current limiting resistor for satisfying the demand in the USB standard relating to the current allowable value IS, and the role as the pull-down resistors for preventing occurrence of a shoot-through current which flows through the circuit in the first stage of the detection buffer 102. Therefore, a specific effect differing from the conventional example can be obtained.

6. Differential Receiver

Figure 6:
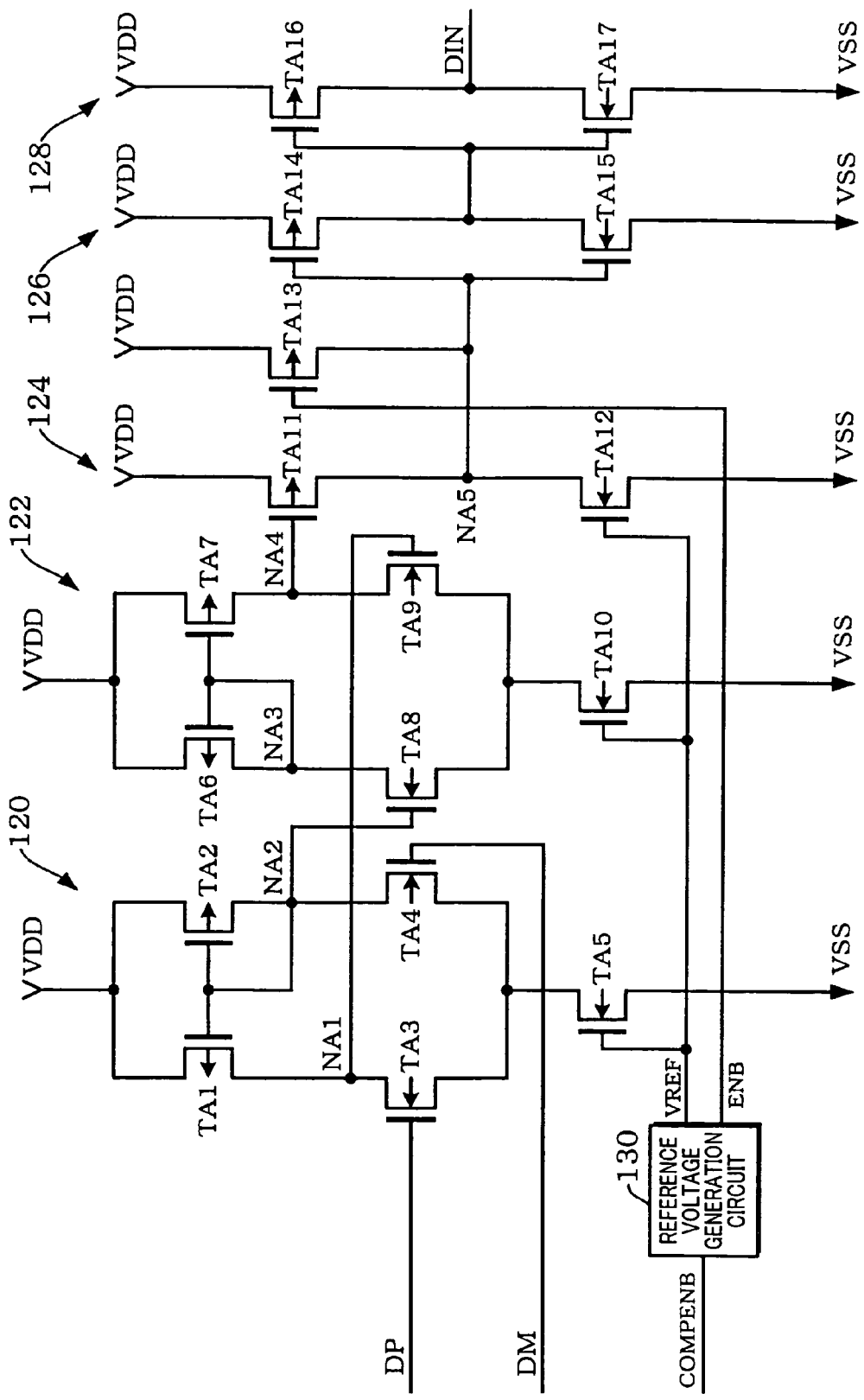
FIG. 6 shows a differential receiver.

FIG. 6 shows the differential receiver 32 (for FS). The differential receiver 32 includes operational amplifier circuits 120 and 122, an output circuit 124, inverter circuits 126 and 128, and a reference voltage generation circuit 130. The differential receiver 32 may have a configuration in which some of these circuits are omitted.

The operational amplifier circuit 120 includes P-type (first conductivity type in a broad sense; hereinafter the same) transistors TA1 and TA2 forming a current mirror circuit, N-type (second conductivity type in a broad sense; hereinafter the same) transistors TA3 and TA4 forming a differential pair, and an N-type transistor TA5 forming a current source. The operational amplifier circuit 122 includes P-type transistors TA6 and TA7 forming a current mirror circuit, N-type transistors TA8 and TA9 forming a differential pair, and an N-type transistor TA10 forming a current source. The output circuit 124 includes a P-type drive transistor TA11, and an N-type transistor TA12 which is connected in series with the transistor TA11 and makes up a current source. The output circuit 124 includes a P-type transistor TA13 for setting an output node NA5 of the output circuit 124 at a power supply voltage (VDD) when the enable signal ENB (COMPENB) is at the low level (inactive).

The signals DP and DM (first and second signals) are input to gates of the transistor TA3 and TA4, which are first and second differential inputs of the operational amplifier circuit 120. Output signals from output nodes NA2 and NA1 of the operational amplifier circuit 120 are input to gates of the transistors TA8 and TA9 which are first and second differential inputs of a calculation circuit 122. An output signal from an output node NA4 of the calculation circuit 122 is input to a gate of the transistor TA11 of an output circuit 124. An output signal from the output node NA5 of the output circuit 124 is buffered by an inverter circuit 128 formed by an inverter circuit 126 formed by transistors TA14 and TA15 and transistors TA16 and TA17, and output as a signal DIN. In this embodiment, the voltages denoted by VDD and VSS need not be the same voltage. For example, the voltage VDD of the inverter circuits 126 and 128 shown in FIG. 6 may be set to be lower than the voltage VDD of the operational amplifier circuits 120 and 122.

A reference voltage generation circuit 130 receives a comparator enable signal COMPENB, and outputs a reference voltage VREF and an enable signal ENB. The output reference voltage VREF is input to gates of the transistors TA5, TA10, and TA12 forming a current source. The enable signal ENB is input to a gate of the transistor TA13 of the output circuit 124.

According to the differential receiver 32 shown in FIG. 6, when the enable signal COMPENB is set to the low level (inactive), the reference voltage VREF is set to the power supply voltage (VSS), whereby the current source transistors TA5 and TA10 of the operational amplifier circuits 120 and 122 are turned OFF. The current source transistor TA12 of the output circuit 124 is also turned OFF. This terminates current which flows through the operational amplifier circuits 120 and 122, whereby power consumption can be reduced.

Moreover, since the transistor TA13 is turned ON when the enable signal COMPENB is set to the low level, whereby the output node NA5 of the output circuit 124 is set to the power supply voltage (VDD). This prevents a problem in which a shoot-through current flows through the inverter circuits 126 and 128 can be prevented. Specifically, if the transistor TA13 is not provided, the output node NA5 is set to the floating state in which no voltage is supplied when the current source transistor TA12 is turned OFF, whereby a shoot-through current flows through the inverter circuits 126 and 128. Since the output node NA5 is set to the power supply voltage (VDD) by providing the transistor TA13, such a problem can be prevented.

Figure 7:
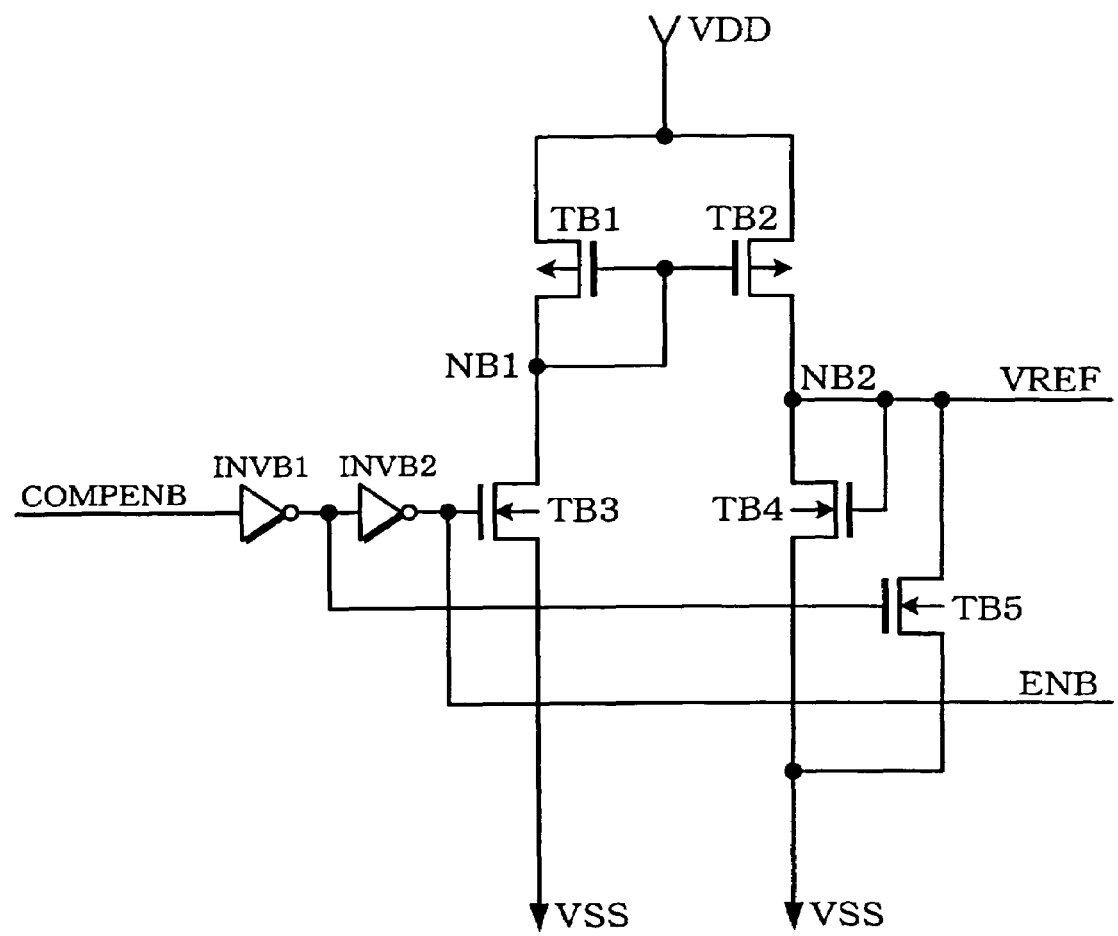
FIG. 7 shows a reference voltage generation circuit.

FIG. 7 shows the reference voltage generation circuit 130. The reference voltage generation circuit 130 includes P-type (first conductivity type) transistors TB1 and TB2 forming a current mirror circuit. The reference voltage generation circuit 130 also includes an N-type (second conductivity type) transistor TB3 which is connected in series with the transistor TB1 and is turned ON when the enable signal COMPENB is active. The reference voltage generation circuit 130 also includes an N-type transistor TB4 which is connected in series with the transistor TB2 and is connected with an output node NB2 of the reference voltage generation circuit 130 at its gate and drain. The reference voltage generation circuit 130 also includes an N-type transistor TB5 provided between the output node NB2 and the power supply VSS.

When the signal COMPENB is set to the high level (active), the transistor TB3 is turned ON. This causes current which flows through the transistors TB1 and TB3 to flow through the transistors TB2 and TB4 by the current mirror, whereby the reference voltage VREF occurs at the output node NB2. When the signal COMPENB is set to the low level (inactive), the transistor TB3 is turned OFF and the transistor TB5 is turned ON.

According to the reference voltage generation circuit 130 shown in FIG. 7, since the transistor TB5 is turned ON when the enable signal COMPENB is set to the low level, the output node NB5 is set to the power supply voltage (VSS). This causes the transistors TA5, TA10, and TA12 shown in FIG. 6 to be turned OFF, whereby power consumption can be reduced. When the enable signal COMPENB is set to the low level, the transistors TB1 to TB4 are turned OFF and the transistor TB5 is turned ON. This terminates current which flows through the reference voltage generation circuit 130, whereby power consumption can be reduced.

7. Single End Receiver

Figure 8:
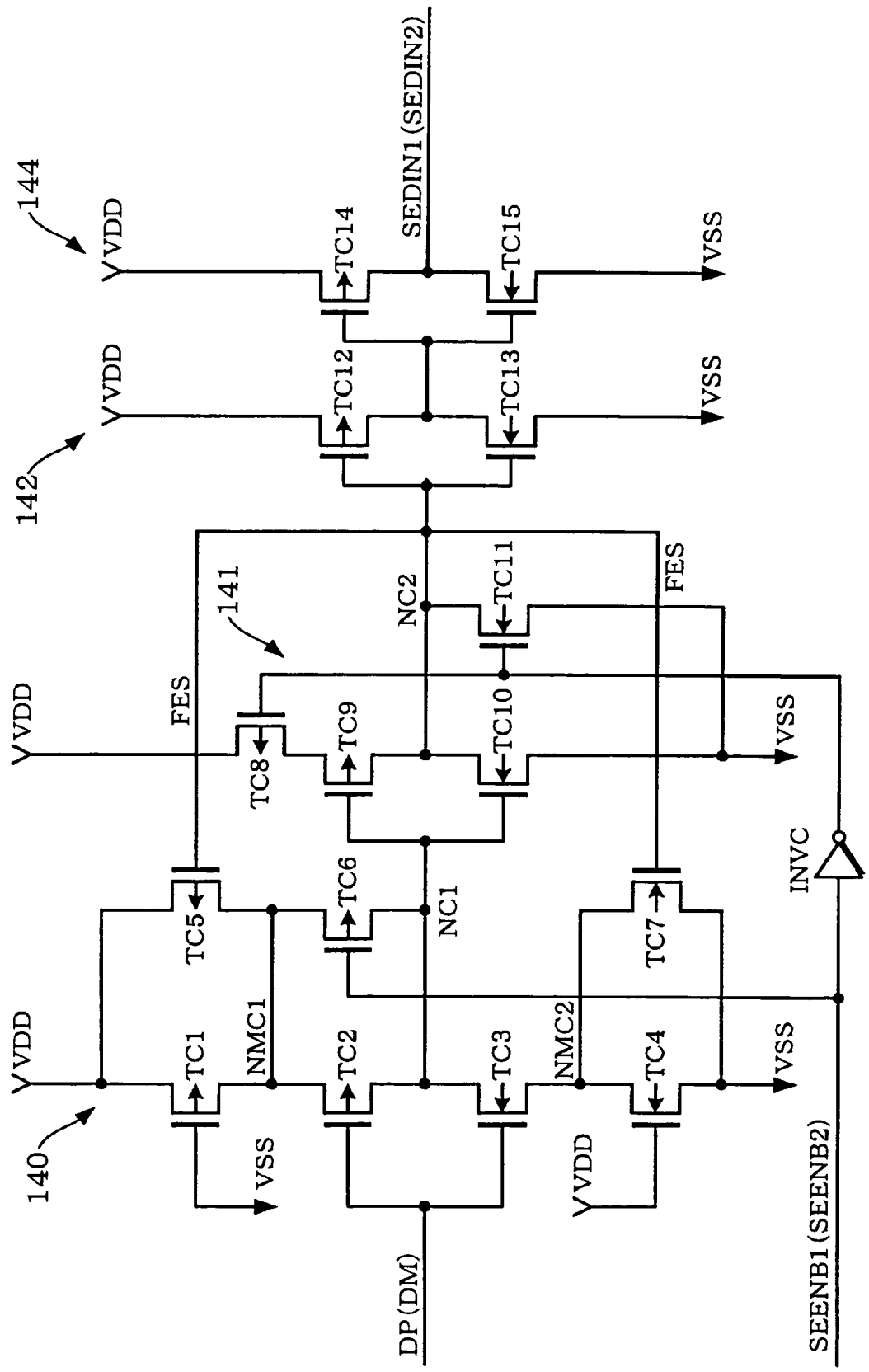
FIG. 8 shows a single end receiver.

FIG. 8 shows the single end receiver 34. The configuration of the single end receiver 36 is the same as the configuration of the single end receiver 34. Therefore, description is omitted.

The single end receiver 34 includes a first inverter circuit 140 to which the signal DP (signal DM in the single end receiver 36) is input, and a second inverter circuit 141 having an input to which an output node NC1 of the first inverter circuit 140 is connected.

The inverter circuit 140 includes transistors TC1, TC2, TC3, and TC4 connected in series between the power supplies VDD and VSS.

In more detail, the inverter circuit 140 includes the P-type (first conductivity type) transistor TC1 provided between a node of the second power supply VDD and a first intermediate node NMC1. The transistor TC1 is always set in the ON state by inputting the voltage of the power supply VSS to a gate of the transistor TC1. The inverter circuit 140 includes the P-type transistor TC2 which is provided between the intermediate node NMC1 and the output node NC1 and has a gate to which the signal DP (DM) is input. The inverter circuit 140 includes the N-type (second conductivity type) transistor TC3 which is provided between the output node NC1 and a second intermediate node NMC2 and has a gate to which the signal DP (DM) is input. The inverter circuit 140 includes the N-type transistor TC4 provided between the node of the first power supply VSS and the second intermediate node NMC2. The transistor TC4 is always set in the ON state by inputting the voltage of the power supply VDD to a gate of the transistor TC4.

The inverter circuit 140 includes transistors TC5, TC6, and TC7 which are respectively connected in parallel with the transistors TC1, TC2, and TC4.

In more detail, the inverter circuit 140 includes the P-type transistor TC5 which is provided between the node of the power supply VDD and the intermediate node NMC1 and has a gate to which a feedback signal FES from the inverter circuit 141 is input. The inverter circuit 140 includes the P-type transistor TC6 provided between the intermediate node NMC1 and the output node NC1. The inverter circuit 140 includes the N-type transistor TC7 which is provided between the intermediate node NMC2 and the node of the power supply VSS and has a gate to which the feedback signal FES is input.

The inverter circuit 141 includes P-type transistors TC8 and TC9 connected in series between the node of the power supply VDD and an output node NC2. The inverter circuit 141 includes an N-type transistor TC10 provided between the output node NC2 and the node of the power supply VSS. The inverter circuit 141 includes an N-type transistor TC11 provided in parallel with the transistor TC10 between the output node NC2 and the node of the power supply VSS. An inversion signal of the enable signal SEENB1 (SEENB2) is input to the gates of the transistors TC8 and TC11. The output node NC1 of the inverter circuit 140 is connected with the gates of the transistors TC9 and TC10. The output signal from the output node NC2 of the inverter circuit 141 is buffered by the inverter circuit 142 formed by transistors TC12 and TC13 and an inverter circuit 144 formed by transistors TC14 and TC15, and is output as the signal SEDIN1 (SEDIN2).

In FIG. 8, when the signal DP (DM) is at the low level, the voltage of the output node NC2 is set to the low level. This causes the transistor TC5 to be turned ON, whereby the on-resistance of the P-type transistor is decreased. This increases the threshold voltage when the signal DP (DM) changes from the low level to the high level. When the signal DP (DM) is at the high level, the voltage of the output node NC2 is set to the high level. This causes the transistor TC7 to be turned ON, whereby the on-resistance of the N-type transistor is decreased. This decreases the threshold voltage when the signal DP (DM) changes from the high level to the low level. The hysteresis characteristics relating to the threshold voltage are implemented in this manner.

In FIG. 8, the transistor TC6 is turned ON when the enable signal SEENB1 (SEENB2) is set to the low level (inactive), whereby the output node NC1 of the inverter circuit 140 is set to the voltage of the power supply VDD. Specifically, the transistor TC1 is always set in the ON state in FIG. 8 in order to implement the hysteresis characteristics relating to the threshold voltage. Therefore, the node of the power supply VDD and the output node NC1 are electrically connected when the transistor TC6 is turned ON, whereby the output node NC1 is set to the voltage of the power supply VDD. In FIG. 8, the output node NC1 is set to the power supply voltage by effectively utilizing the transistor TC1 set to the ON state as described above.

The transistor TC11 is turned ON when the enable signal SEENB1 is set to the low level, whereby the output node NC2 of the inverter circuit 141 is set to the voltage of the power supply VSS. The transistor TC8 is turned OFF, whereby current which flows through the path of the transistors TC8, TC9, and TC10 of the inverter circuit 141 is terminated.

The signal lines for the signals DP and DM are in the floating state in which no signal is supplied before the USB cable is connected. Therefore, if the signal lines for the signals DP and DM in the floating state are connected with the transistors TC2 and TC3 of the inverter circuit 140, a shoot-through current may occur in the inverter circuit 140. A shoot-through current may also occur in the inverter circuits 141, 142, and 144 in the next stage due to unstable voltages of the output nodes NC1 and NC2.

In FIG. 8, when the enable signal SEENB1 (SEENB2) is set to the low level, the output nodes NC1 and NC2 of the inverter circuits 140 and 141 are set to the power supply voltages (voltages of the power supplies VDD and VSS). Therefore, a problem in which a shoot-through current occurs in the inverter circuits 140, 141, 142, and 144 can be prevented by setting the enable signals SEENB1 and SEENB2 at the low level before the USB cable is connected, whereby power consumption can be reduced.

Figure 9:
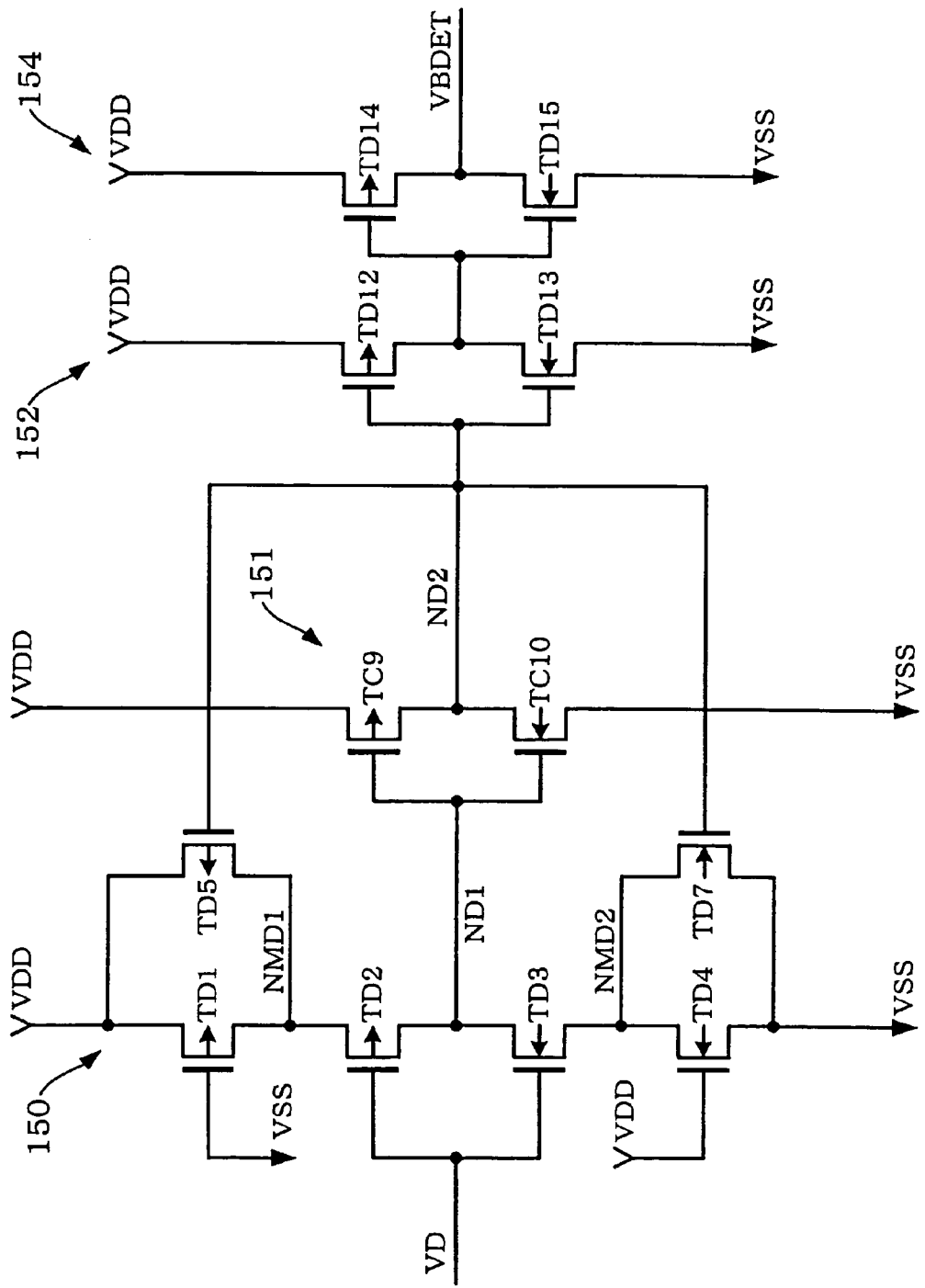
FIG. 9 shows a detection buffer.

FIG. 9 shows the detection buffer 102 shown in FIG. 3. The detection buffer 102 shown in FIG. 9 has approximately the same configuration as the configuration of the single end receiver 34 shown in FIG. 8. The detection buffer 102 differs from the single end receiver 34 in that transistors corresponding to the transistors TC6, TC8, and TC11 shown in FIG. 8 are omitted in FIG. 9.

The resistance to signal noise is increased by using the detection buffer 102 having hysteresis characteristics relating to the threshold voltage as shown in FIG. 9, whereby the VBUS voltage can be detected with higher reliability and certainty.

8. HS Mode

The full speed (FS) mode in which data is transferred at 12 Mbps is defined in USB. In USB 2.0, the high speed (HS) mode at a transfer rate of 480 Mbps is defined in addition to the FS mode. The method in this embodiment may also be applied to an FS receiver circuit of a physical layer circuit which supports the HS mode.

Figure 10:
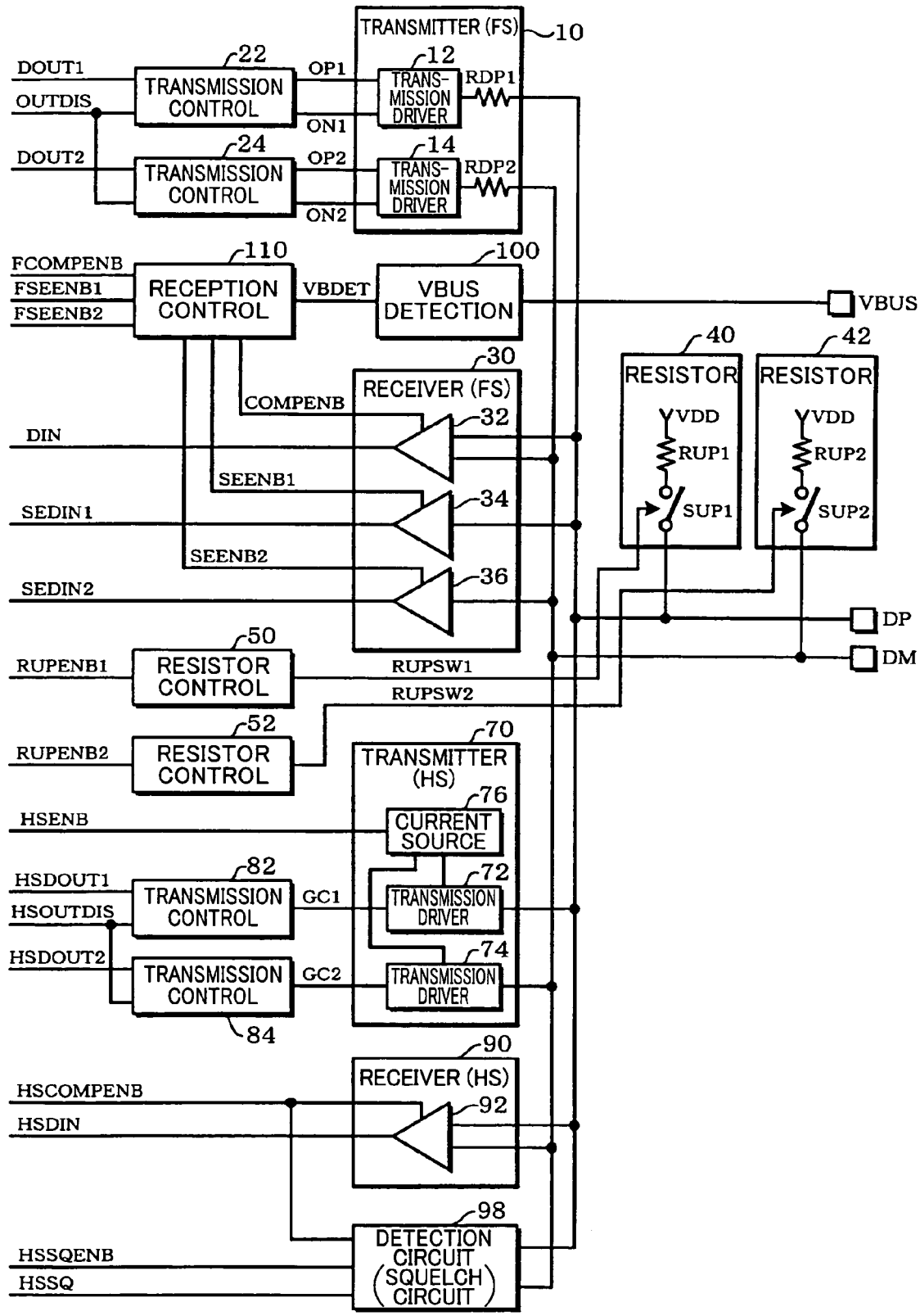
FIG. 10 shows an HS physical layer circuit.

FIG. 10 shows a physical layer circuit for implementing the USB 2.0 HS mode. FIG. 10 differs from FIG. 2 in that an HS transmitter circuit 70, transmission control circuits 82 and 84, an HS receiver circuit 90, and a detection circuits 98 are further provided in FIG. 10.

The HS transmitter circuit 70 is connected with the signal lines for the signals DP and DM, and includes a current source 76 (constant current source) and first and second transmission drivers 72 and 74 (current drivers). The current source 76 supplies current to the transmission drivers 72 and 74 when the enable signal HSENB becomes active.

The HS first and second transmission control circuits 82 and 84 are circuits for controlling first and second transmission drivers 72 and 74. In more detail, the transmission control circuit 82 receives a transmission data signal HSDOUT1 and an output disable signal HSOUTDIS from the circuit in the previous stage, and outputs a control signal GC1 to the transmission driver 72. The transmission control circuit 84 receives signals HSDOUT2 and HSOUTDIS from the circuit in the previous stage, and outputs a control signal GC2 to the transmission driver 74.

The receiver circuit 90 is a circuit for performing reception processing in the USB HS mode, and includes a differential receiver 92. The differential receiver 92 (differential comparator) differentially amplifies the differential signals input through the signal lines for the signals DP and DM, and outputs the amplified signal to the circuit in the next stage as a data signal HSDIN. The differential receiver 92 may be implemented by an operational amplifier circuit having first and second differential inputs to which the differential signals DP and DM are input. The operation of the differential receiver 92 is enabled or disabled by an enable signal HSCOMPENB.

The detection circuit 98 (squelch circuit) is a circuit for distinguishing whether the signal (DP and DM) on the USB is effective data or noise. In more detail, the detection circuit 98 detects the amplitude of the signal by holding the peak value of the USB signal and detecting the envelope of the signal. For example, the detection circuit 98 judges that the signal is noise when the amplitude is 100 mV or less, and judges that the signal is effective data when the amplitude is 150 mV or more. When the detection circuit 98 judges that the signal is effective data, the detection circuit 98 makes an output signal HSSQ active. The operation of the detection circuit 98 is enabled or disabled by an enable signal HSSQENB.

As shown in FIG. 10, the VBUS detection circuit 100 and the reception control circuit 110 as shown in FIG. 2 may be provided in such an HS mode physical layer circuit. When the VBUS detection signal VBDET is inactive, the reception control circuit 110 makes the signals COMPENB, SEENB1 and SEENB2 inactive to disable the FS receiver circuit 30.

Figure 11:
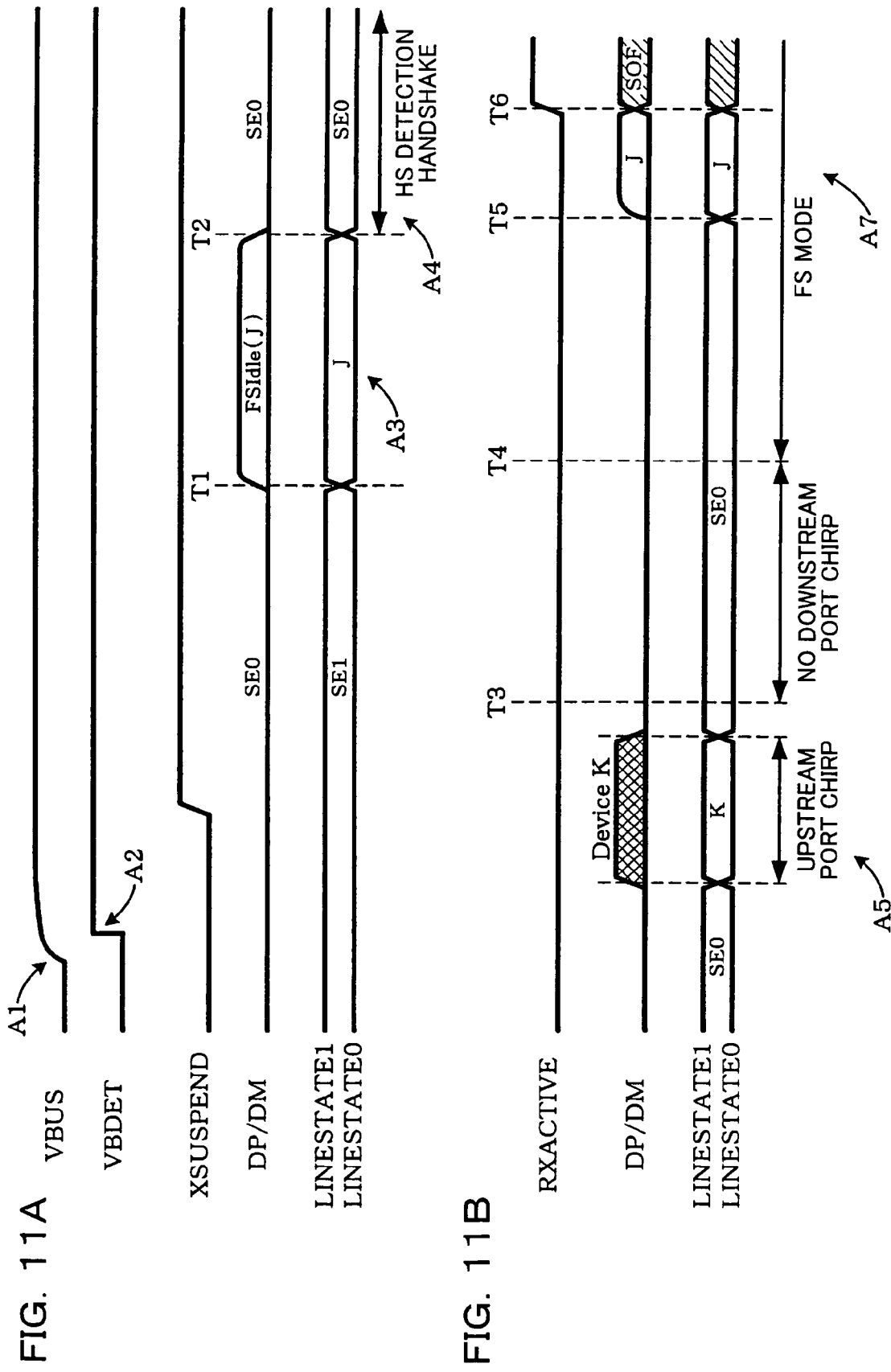
FIGS. 11A and 11B are timing waveform charts showing a sequence from a suspend state to start of data transfer in a USB HS mode.

FIGS. 11A and 11B are timing waveform charts showing a sequence from the suspend state to the start of data transfer in the USB HS mode.

When the VBUS voltage rises as indicated by A1 shown in FIG. 11A, the VBUS detection signal VBDET is set to the high level (active) as indicated by A2. This allows the receiver circuit 30 to be enabled.

As indicated by A3 shown in FIG. 11A, the single end receivers 34 and 36 detect that the line state is an FS J state. It suffices that the single end receivers 34 and 36 be enabled before a timing T1 at which the detection processing of the FS J state starts. When a reset (SE0) is sent from a downstream port, an HS detection handshake starts at a timing T2.

When the HS detection handshake has started, the HS transmitter circuit and receiver circuit are enabled, whereby a chirp (K) starts to be sent as indicated by A5 shown in FIG. 11B.

After sending of the chirp (K) has been completed, the transmission of the chirp (K) starts at a timing T3 when a downstream port supports the HS mode, whereby data transfer in the HS mode can be achieved. However, since the chirp cannot be detected before a timing T4 in FIG. 11B, the data transfer control device returns to the FS mode, and waits for completion of the reset sequence. The reset sequence ends at a timing T5, and data transfer in the FS mode starts at a timing T6. If a downstream port chirp is sent, data transfer in the HS mode can be started at the timing T6.

In USB 2.0 which supports the HS mode, the FS J state is detected by the FS receiver circuit 30 before the HS detection handshake. Therefore, in a conventional method, the FS receiver circuit 30 is enabled before the USB cable is connected and the VBUS voltage is supplied, whereby unnecessary electric power is consumed by the receiver circuit 30.

In this embodiment, the FS receiver circuit 30 can be enabled on condition that the VBUS detection signal VBDET has become active as indicated by A2 shown in FIG. 11A. Therefore, even if the firmware of the processing section makes the second enable signals FCOMPENB, FSEENB1 and FSEENB2 active before the VBUS voltage rises as indicated by A1, since these signals are masked by the VBUS detection signal VBDET, the enable signals COMPENB, SEENB1, and SEENB2 do not become active. Therefore, a problem in which unnecessary electric power is consumed by the receiver circuit 30 before the USB cable is connected can be prevented.

The single end receivers 34 and 36 are enabled before the timing T1 shown in FIG. 11A (at timing between the timing at which the VBUS detection signal VBDET becomes active and the timing T1), for example. Power consumption can be minimized by enabling the differential receiver 32 before the timing T6 shown in FIG. 11B (timing between the timings T1 and T6), whereby an optimum power management can be implemented.

9. Electronic Instrument

Figure 12:
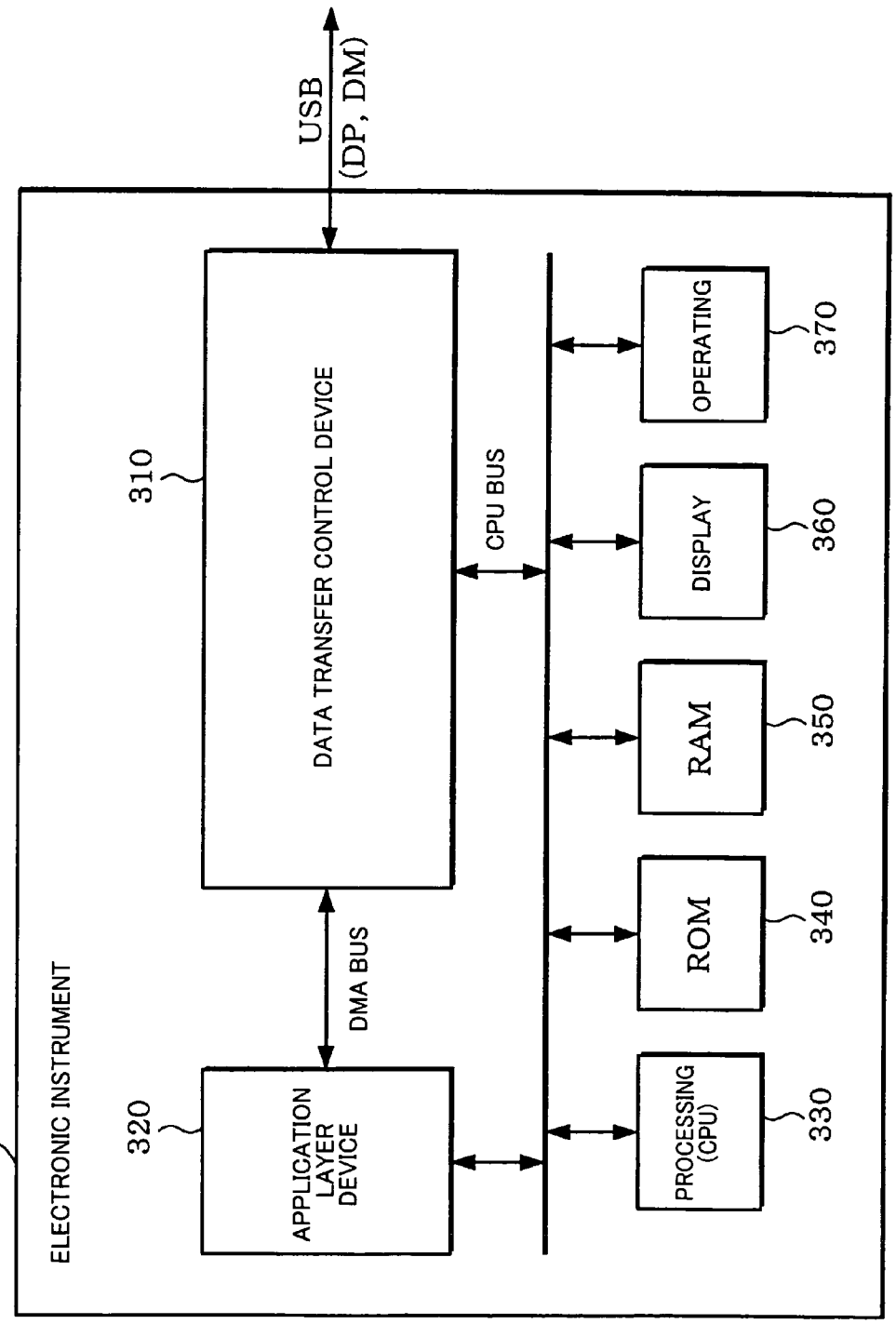
FIG. 12 shows an electronic instrument.

FIG. 12 shows an electronic instrument according to one embodiment of the present invention. An electronic instrument 300 includes a data transfer control device 310 described in this embodiment, an application layer device 320 formed by ASIC or the like, a CPU 330, a ROM 340, a RAM 350, a display section 360, and an operation section 370. The electronic instrument 300 may have a configuration in which some of these functional blocks are omitted.

The application layer device 320 is a device which implements an application engine of a portable telephone, a device which controls a drive of an information storage medium (hard disk or optical disk), a device which controls a printer, a device including an MPEG encoder and an MPEG decoder, or the like. The processing section 330 (CPU) controls the data transfer control device 310 and the entire electronic instrument. The ROM 340 stores a control program and various types of data. The RAM 350 functions as a work area and a data storage area for the processing section 330 and the data transfer control device 310. The display section 360 displays various types of information to the user. The operation section 370 allows the user to operate the electronic instrument.

In FIG. 12, a DMA bus and a CPU bus are separated. However, these buses may be one common bus. A processing section which controls the data transfer control device 310 and a processing section which controls the electronic instrument may be provided independently. As examples of electronic instruments to which this embodiment can be applied, portable telephones, optical disk (CD-ROM and DVD) drives, magneto-optical (MO) disk drives, hard disk drives, TVs, TV tuners, VTRs, video cameras, audio devices, projectors, personal computers, electronic notebooks, PDAs, word processors, and the like can be given.

Although only some embodiments of the present invention have been described in detail above, those skilled in the art will readily appreciate that many modifications are possible in the embodiments without departing from the novel teachings and advantages of this invention. Accordingly, all such modifications are intended to be included within the scope of this invention.

Any term (such as USB, DP, DM, VSS, VDD, P-type, and N-type) cited with a different term having broader or the same meaning (such as a given interface standard, a first signal, a second signal, a first power supply, a second power supply, a first conductivity type, and a second conductivity type) at least once in this specification and drawings can be replaced by the different term in any place in this specification and drawings.

The configurations of the data transfer control device, the physical layer circuit, the VBUS detection circuit, the reception control circuit, and the like implemented by the present invention are not limited to the configurations shown in FIGS. 1 to 3, 10, etc. It is possible to make various modifications. The configurations of the differential receiver and the single end receiver are not limited to the configurations described with reference to FIGS. 6 to 9. It is possible to make various modifications.

What is claimed is:

1. A physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;

a receiver circuit which receives first and second signals which are differential signals and performs reception processing using the first and second signals; and a reception control circuit which outputs a first enable signal to the receiver circuit, the reception control circuit making the first enable signal inactive and disables the receiver circuit when the VBUS detection signal is inactive, the reception control circuit receiving a second enable signal set by a processing section, the reception control circuit disabling the receiver circuit when the second enable signal is active but the VBUS detection signal is inactive, and the reception control circuit making the first enable signal active and enables the receiver circuit when the second enable signal and the VBUS detection signal are active.

2. The physical layer circuit as defined in claim 1, wherein:

the VBUS detection circuit includes a first resistor provided between the VBUS line and a detection node and a second resistor provided between the detection node and a node of a first power supply; and the VBUS detection circuit makes the VBUS detection signal active when a voltage of the detection node has exceeded a predetermined detection voltage.

3. The physical layer circuit as defined in claim 2, wherein VB×RV1/(RV1+RV2)<VR is satisfied, where RV1 and RV2 represent resistances of the first and second resistors, VB represents a voltage supplied to the VBUS line, and VR represents a rated voltage of the VBUS detection circuit.

4. The physical layer circuit as defined in claim 2, wherein RV1+RV2>VB/IS is satisfied, where RV1 and RV2 represent resistances of the first and second resistors, VB represents a voltage supplied to the VBUS line, and IS represents an allowable value of current flowing from the VBUS line to the physical layer circuit in suspend mode.

5. The physical layer circuit as defined in claim 1, wherein:
the receiver circuit includes a differential receiver having first and second differential inputs to which the first and second signals are respectively input; and
a current source transistor of an operational amplifier circuit in the differential receiver is turned OFF when the first enable signal is inactive.

6. The physical layer circuit as defined in claim 2, wherein:
the receiver circuit includes a differential receiver having first and second differential inputs to which the first and second signals are respectively input; and
a current source transistor of an operational amplifier circuit in the differential receiver is turned OFF when the first enable signal is inactive.

7. The physical layer circuit as defined in claim 5, further comprising:
a reference voltage generation circuit which outputs a reference voltage to the current source transistor,
wherein an output node of the reference voltage generation circuit is set to a power supply voltage and a current flowing through the reference voltage generation circuit is terminated, when the first enable signal is inactive.

8. The physical layer circuit as defined in claim 6, further comprising:
a reference voltage generation circuit which outputs a reference voltage to the current source transistor,
wherein an output node of the reference voltage generation circuit is set to a power supply voltage and a current flowing through the reference voltage generation circuit is terminated, when the first enable signal is inactive.

9. A physical layer circuit for data transfer using a Universal Serial Bus (USB), the physical layer circuit comprising:
a VBUS detection circuit which monitors a voltage of a VBUS line of USB, and makes a VBUS detection signal active when the voltage of the VBUS line has exceeded a predetermined voltage;
a receiver circuit which receives first and second signals which are differential signals and performs reception processing using the first and second signals;
a reception control circuit which outputs a first enable signal to the receiver circuit,
wherein the reception control circuit makes the first enable signal inactive and disables the receiver circuit when the VBUS detection signal is inactive; and
a reference voltage generation circuit which outputs a reference voltage to a current source transistor which is included in an operational amplifier circuit of a differential receiver of the receiver circuit, wherein the reference voltage generation circuit includes:
first and second transistors which are of a first conductivity type and form a current mirror circuit;
third transistor which is of a second conductivity type, connected in series with the first transistor, and turned ON when the first enable signal is active;
fourth transistor which is of the second conductivity type, connected in series with the second transistor, and has a gate and a drain connected to an output node of the reference voltage generation circuit; and
fifth transistor which is of the second conductivity type and provided between the output node and a node of a first power supply,
wherein the third transistor is turned OFF and the fifth transistor is turned ON when the first enable signal is inactive.

10. A physical layer circuit for data transfer using a Universal Serial Bus (USB), the physical layer circuit comprising:
a VBUS detection circuit which monitors a voltage of a VBUS line of USB, and makes a VBUS detection signal active when the voltage of the VBUS line has exceeded a predetermined voltage;
a receiver circuit which receives first and second signal which are differential signals and performs reception processing using the first and second signals;
wherein the VBUS detection circuit includes a first resistor provided between the VBUS line and a detection node and a second resistor provided between the detection node and a first power supply; and
a reception control circuit which outputs a first enable signal to the receiver circuit,
wherein the reception control circuit makes the first enable signal inactive and disables the receiver circuit when the VBUS detection signal is inactive; and
a reference voltage generation circuit which outputs a reference voltage to a current source transistor which is included in an operational amplifier circuit of a differential receiver of the receiver circuit, wherein the reference voltage generation circuit includes:
first and second transistors which are of a first conductivity type and form a current mirror circuit;
third transistor which is of a second conductivity type, connected in series with the first transistor, and turned ON when the first enable signal is active;
fourth transistor which is of the second conductivity type, connected in series with the second transistor, and has a gate and a drain connected to an output node of the reference voltage generation circuit; and
fifth transistor which is of the second conductivity type and provided between the output node and a node of a first power supply; and
wherein the third transistor is turned OFF and the fifth transistor is turned ON when the first enable signal is inactive.

11. The physical layer circuit as defined in claim 1, wherein:
the receiver circuit includes a first single end receiver having an input to which the first signal is input, and a second single end receiver having an input to which the second signal is input;
wherein each of the first and second single end receivers includes a first inverter circuit to which the first or second signal is input, and a second inverter circuit having an input to which an output node of the first inverter circuit is connected; and
wherein the output node of the first inverter circuit and an output node of the second inverter circuit are set to a first power supply voltage and a second power supply voltage when the first enable signal is inactive.

12. The physical layer circuit as defined in claim 2, wherein:
the receiver circuit includes a first single end receiver having an input to which the first signal is input, and a second single end receiver having an input to which the second signal is input;

wherein each of the first and second single end receivers includes a first inverter circuit to which the first or second signal is input, and a second inverter circuit having an input to which an output node of the first inverter circuit is connected; and wherein the output node of the first inverter circuit and an output node of the second inverter circuit are set to a first power supply voltage and second power supply voltage when the first enable signal is inactive.

13. A physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;

a receiver circuit which receives first and second signals which are differential signals and performs reception processing using the first and second signals;

a reception control circuit which outputs a first enable signal to the receiver circuit, wherein the reception control circuit makes the first enable signal inactive and disables the receiver circuit when the VBUS detection signal is inactive;

a first inverter circuit to which the first or second signal is input and being included in each of first and second single end receivers of the receiver circuit; and a second inverter circuit having an input to which an output node of the first inverter circuit is connected and being included in each of the first and second single end receivers of the receiver circuit wherein the first inverter circuit includes:

a first transistor which is of a first conductivity type, provided between a node of a second power supply and a first intermediate node, and set to an ON state;

a second transistor which is of the first conductivity type, provided between the first intermediate node and the output node of the first inverter circuit, and has a gate to which the first or second signal is input;

a third transistor which is of a second conductivity type, provided between the output node and a second intermediate node, and has a gate to which the first or second signal is input;

a fourth transistor which is of the second conductivity type, provided between the second intermediate node and a node of a first power supply, and set to an ON state;

a fifth transistor which is of the first conductivity type, provided between the node of the second power supply and the first intermediate node, and has a gate to which a feedback signal from the second inverter circuit is input;

a sixth transistor which is of the first conductivity type and provided between the first intermediate node and the output node; and a seventh transistor which is of the second conductivity type, provided between the second intermediate node and the node of the first power supply, and has a gate to which the feedback signal is input, wherein the sixth transistor is turned ON when the first enable signal is inactive.

14. A physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;

a receiver circuit which receives first and second signal which are differential signals and performs reception processing using the first and second signals;

wherein the VBUS detection circuit includes a first resistor provided between the VBUS line and a detection node and a second resistor provided between the detection node and a first power supply;

a reception control circuit which outputs a first enable signal to the receiver circuit, wherein the reception control circuit makes the first enable signal inactive and disables the receiver circuit when the VBUS detection signal is inactive;

a first inverter circuit to which the first or second signal is input and being included in each of first and second single end receivers of the receiver circuit; and a second inverter circuit having an input to which an output node of the first inverter circuit is connected and being included in each of the first and second single end receivers of the receiver circuit wherein the first inverter circuit includes:

a first transistor which is of a first conductivity type, provided between a node of a second power supply and a first intermediate node, and set to an ON state;

a second transistor which is of the first conductivity type, provided between the first intermediate node and the output node of the first inverter circuit, and has a gate to which the first or second signal is input;

a third transistor which is of a second conductivity type, provided between the output node and a second intermediate node, and has a gate to which the first or second signal is input;

a fourth transistor which is of the second conductivity type, provided between the second intermediate node and a node of a first power supply, and set to an ON state;

a fifth transistor which is of the first conductivity type, provided between the node of the second power supply and the first intermediate node, and has a gate to which a feedback signal from the second inverter circuit is input;

a sixth transistor which is of the first conductivity type and provided between the first intermediate node and the output node; and a seventh transistor which is of the second conductivity type, provided between the second intermediate node and the node of the first power supply, and has a gate to which the feedback signal is input, wherein the sixth transistor is turned ON when the first enable signal is inactive.

15. The physical layer circuit as defined in claim 1, wherein the receiver circuit is a USB full speed receiver circuit.

16. A data transfer control device, comprising:

the physical layer circuit as defined in claim 1; and a transfer controller which controls data transfer using USB.

17. An electronic instrument, comprising:

the data transfer control device as defined in claim 16; and a processing section which controls the data transfer control device.

18. A physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage;
a receiver circuit which receives first and second signals which are differential signals and performs reception processing using the first and second signals; and
a reception control circuit which outputs a first enable signal to the receiver circuit,
wherein the reception control circuit makes the first enable signal inactive and disables the receiver circuit when the VBUS detection signal is inactive;
the receiver circuit includes a differential receiver having first and second differential inputs to which the first and second signals are respectively input; and
a current source transistor of an operational amplifier circuit in the differential receiver turned off when the first enable signal is inactive;
a reference voltage generation circuit which outputs a reference voltage to the current source transistor, wherein an output node of the reference voltage generation circuit is set to a power supply voltage in a current flowing through the reference voltage generation circuit is terminated, when the first enable circuit is inactive;
wherein the reference voltage generation circuit includes:
first and second transistors which are of a first conductivity type and form a current mirror circuit;
third transistor which is of a second conductivity type, connected in series with the first transistor, and turned on when the first enable signal is active;
fourth transistor which is of the second conductivity type, connected in series with the second transistor, and has a gate and a drain connected to the output node of the reference voltage generation circuit; and
fifth transistor which is of the second conductivity type and provided between the output node and a node of a first power supply; and
wherein the third transistor is turned off and the fifth transistor is turned on when the first enable signal is inactive.

19. A physical layer circuit for data transfer using a Universal Serial Bus (USB), the physical layer circuit comprising:
a VBUS detection circuit which monitors a voltage of a VBUS line of USB, and makes a VBUS detection signal active when the voltage of the VBUS line has exceeded a predetermined voltage; and
a receiver circuit which receives first and second signals which are differential signals and performs reception processing using the first and second signals,
wherein the VBUS detection circuit includes a first resistor provided between the VBUS line and a detection node and a second resistor provided between the detection node and a node of a first power supply;
the receiver circuit includes a differential receiver having first and second differential inputs to which the first and second signals are respectively input; and
a current source transistor of an operational amplifier circuit in the differential receiver is turned off when the first enable signal is inactive;
a reference voltage generation circuit which outputs a reference voltage to the current source transistor, wherein in output node of the reference voltage generation circuit is set to a power supply voltage and a current flowing through the reference voltage generation circuit is terminated, when the first enable signal is inactive;

wherein the reference voltage generation circuit includes:
first and second transistors which are of a first conductivity type and form a current mirror circuit;
third transistor which is of a second conductivity type, connected in series with the first transistor, and turned on when the first enable signal is active;
fourth transistor which is of the second conductivity type, connected in series with the second transistor, and has a gate and a drain connected to the output node of the reference voltage generation circuit; and
fifth transistor which is of the second conductivity type and provided between the output node and a node of a first power supply; and
wherein the third transistor is turned off and the fifth transistor is turned on when the first enable signal is inactive.

20. A physical layer circuit for data transfer using a Universal Serial Bus (USB), the physical layer circuit comprising:
a VBUS detection circuit which monitors a voltage of a VBUS line of USB, and makes a VBUS detection signal active when the voltage of the VBUS line has exceeded a predetermined voltage;
a receiver circuit which receives first and second signals which are differential signals and performs reception processing using the first and second signals; and
a reception control circuit which outputs a first enable signal to the receiver circuit,
wherein the reception control circuit makes the first enable signal inactive and disables the receiver circuit when the VBUS detection signal is inactive;
the receiver circuit includes a first single end receiver having an input to which the first signal is input, and a second single and receiver having an input into which the second signal is input;
wherein in each of the first and second single and receivers includes a first inverter circuit to which the first or second signal is input and a second inverter circuit having an input to which an output node of the first inverter circuit is connected;
wherein in the output node of the first inverter circuit and an output node of the second inverter circuit are set to a first power supply voltage and a second power supply voltage when the first enable signal is inactive;
wherein the first inverter circuit includes:
a first transistor which is of a first conductivity type, provided between a node of a second power supply and a first intermediate node, and set to an on state;
a second transistor which is of the first conductivity type, provided between the first intermediate node and the output node of the first inverter circuit, and has a gate to which the first or second signal is input;
a third transistor which is of a second conductivity type, provided between the output node and a second intermediate node, and has a gate to which the first or second signal is input;
a fourth transistor which is of the second conductivity type, provided between the second intermediate node and a node of a first power supply, and set to an on state;
a fifth transistor which is of the first conductivity type, provided between the node of the second power supply and the first intermediate node, and has a gate to which a feedback signal from the second inverter circuit in input;
a sixth transistor which is of the first conductivity type, provided between the first intermediate node and the output node; and a seventh transistor which is of the second conductivity type, provided between the second intermediate node and the node of the first power supply, and has a gate to which the feedback signal is input; and wherein the sixth transistor is turned on when the first enable signal is inactive.

21. A physical layer circuit for data transfer using a Universal Serial Bus (USB), the physical layer circuit comprising:

a VBUS detection circuit which monitors a voltage of a VBUS line of USB, and makes a VBUS detection signal active when the voltage of the VBUS line has exceeded a predetermined voltage; and a receiver circuit which receives first and second signals which are differential signals and performs reception processing using the first and second signals, wherein the VBUS detection circuit includes a first resistor provided between the VBUS line and a detection node and a second resistor provided between the detection node and a node of a first power supply;

wherein the VBUS detection circuit makes the VBUS detection signal active when a voltage of the detection node has exceeded a predetermined detection voltage;

the receiver circuit includes a first single end receiver having input to which the first signal is input, and a second single end receiver having input to which the second signal in input;

wherein each of the first and second single end receivers includes a first inverter circuit to which the first or second signal is input, and a second inverter circuit having an input to which an output node of the first inverter circuit is connected;

wherein the output node of the first inverter circuit and an output node of the second inverter circuit are set to a first power supply voltage and a second power supply voltage when the first enable signal in inactive;

wherein the first inverter circuit includes:

a first transistor which is of a first conductivity type, provided between a node of a second power supply and a first intermediate node, and set to an ON state;

a second transistor which is of the first conductivity type, provided between the first intermediate node and the output node of the first inverter circuit, and has a gate to which the first or second signal is input;

a third transistor which is of a second conductivity type, provided between the output node and a second intermediate node, and has a gate to which the first or second signal is input;

a fourth transistor which is of the second conductivity type, provided between the second intermediate node and a node of a first power supply, and set to an ON state;

a fifth transistor which is of the first conductivity type, provided between the node of the second power supply and the first intermediate node, and has a gate to which a feedback signal from the second inverter circuit is input;

a sixth transistor which is of the first conductivity type and provided between the first intermediate node and the output node; and a seventh transistor which is of the second conductivity type, provided between the second intermediate node and the node of the first power supply, and has a gate to which the feedback signal is input; and wherein the sixth transistor is turned ON when the first enable signal is inactive.

* * * * *